(12) United States Patent
Ramezanian et al.

(10) Patent No.: US 12,290,911 B2
(45) Date of Patent: May 6, 2025

(54) ELECTRONIC MODULE AND INSERT TOOL SYSTEM COMPRISING SUCH AN ELECTRONIC MODULE

(71) Applicant: Robert Bosch GmbH, Stuttgart (DE)

(72) Inventors: Houman Ramezanian, Enntbaden (CH); Joachim Loeblein, Waiblingen (DE); Martin Scherrer, Zuchwil (CH); Stefano Delfini, Bettlach (CH)

(73) Assignee: Robert Bosch GmbH, Stuttgart (DE)

( * ) Notice: Subject to any disclaimer, the term of this patent is extended or adjusted under 35 U.S.C. 154(b) by 736 days.

(21) Appl. No.: 17/536,468

(22) Filed: Nov. 29, 2021

(65) Prior Publication Data
US 2022/0193874 A1     Jun. 23, 2022

(30) Foreign Application Priority Data
Dec. 22, 2020   (DE) ..................... 10 2020 216 454.1

(51) Int. Cl.
*B25F 5/00*          (2006.01)

(52) U.S. Cl.
CPC ............... *B25F 5/00* (2013.01); *B25F 5/006* (2013.01); *B23B 2250/16* (2013.01)

(58) Field of Classification Search
CPC ........ B25F 5/00; B25F 5/006; B23B 2250/16; B25D 2250/221
See application file for complete search history.

(56) References Cited

U.S. PATENT DOCUMENTS

| | | | |
|---|---|---|---|
| 8,231,438 B2 * | 7/2012 | Kuhnle | ................... B24B 45/00 451/359 |
| 8,511,529 B2 * | 8/2013 | Lin | ......................... B25F 5/006 227/8 |
| 8,517,642 B2 | 8/2013 | Borunda | |
| 9,566,696 B2 * | 2/2017 | Yew | ........................ B25B 21/00 |
| 10,739,127 B2 | 8/2020 | Cerwin | |
| 11,597,071 B2 * | 3/2023 | Schadow | .................. B25F 5/02 |
| 2004/0136795 A1 | 7/2004 | Chen | |
| 2005/0214087 A1 * | 9/2005 | Agapiou | ............... B23B 31/006 409/141 |
| 2012/0328381 A1 | 12/2012 | Schmidt et al. | |

(Continued)

FOREIGN PATENT DOCUMENTS

| | | | | |
|---|---|---|---|---|
| CN | 104875082 A | * | 9/2015 | ............. B23B 31/08 |
| CN | 204963887 U | | 1/2016 | |
| CN | 106426009 A | * | 2/2017 | ............. B23B 45/02 |

(Continued)

*Primary Examiner* — Eric A. Gates
(74) *Attorney, Agent, or Firm* — Maginot, Moore & Beck LLP

(57) ABSTRACT

The disclosure is based on an electronic module for an insert tool, in particular a drill bit or a chisel, including at least one electronic device for processing and/or sensing insert-tool-specific characteristics, including at least one holding device for releasably holding the electronic device on the insert tool. The holding device having at least one insert-tool interface having at least one contact surface that, when the holding device is arranged on the insert tool, is in contact, in particular in direct contact, with the insert tool, and including at least one damping unit for damping vibrations acting on the electronic device. The damping unit at least partially constitutes the insert-tool interface.

13 Claims, 7 Drawing Sheets

(56) References Cited

U.S. PATENT DOCUMENTS

2015/0165580 A1    6/2015   Holland

FOREIGN PATENT DOCUMENTS

| | | | | |
|---|---|---|---|---|
| CN | 108188445 A | * | 6/2018 | ............. B23B 41/02 |
| DE | 2 043 941 | | 3/1971 | |
| DE | 10 2011 089 343 A1 | | 6/2013 | |
| DE | 102013014993 A1 | * | 3/2015 | ........... B23B 27/002 |
| DE | 10 2014 215 504 A1 | | 2/2016 | |
| DE | 10 2015 205 172 A1 | | 9/2016 | |
| DE | 10 2017 205 334 A1 | | 10/2018 | |

* cited by examiner

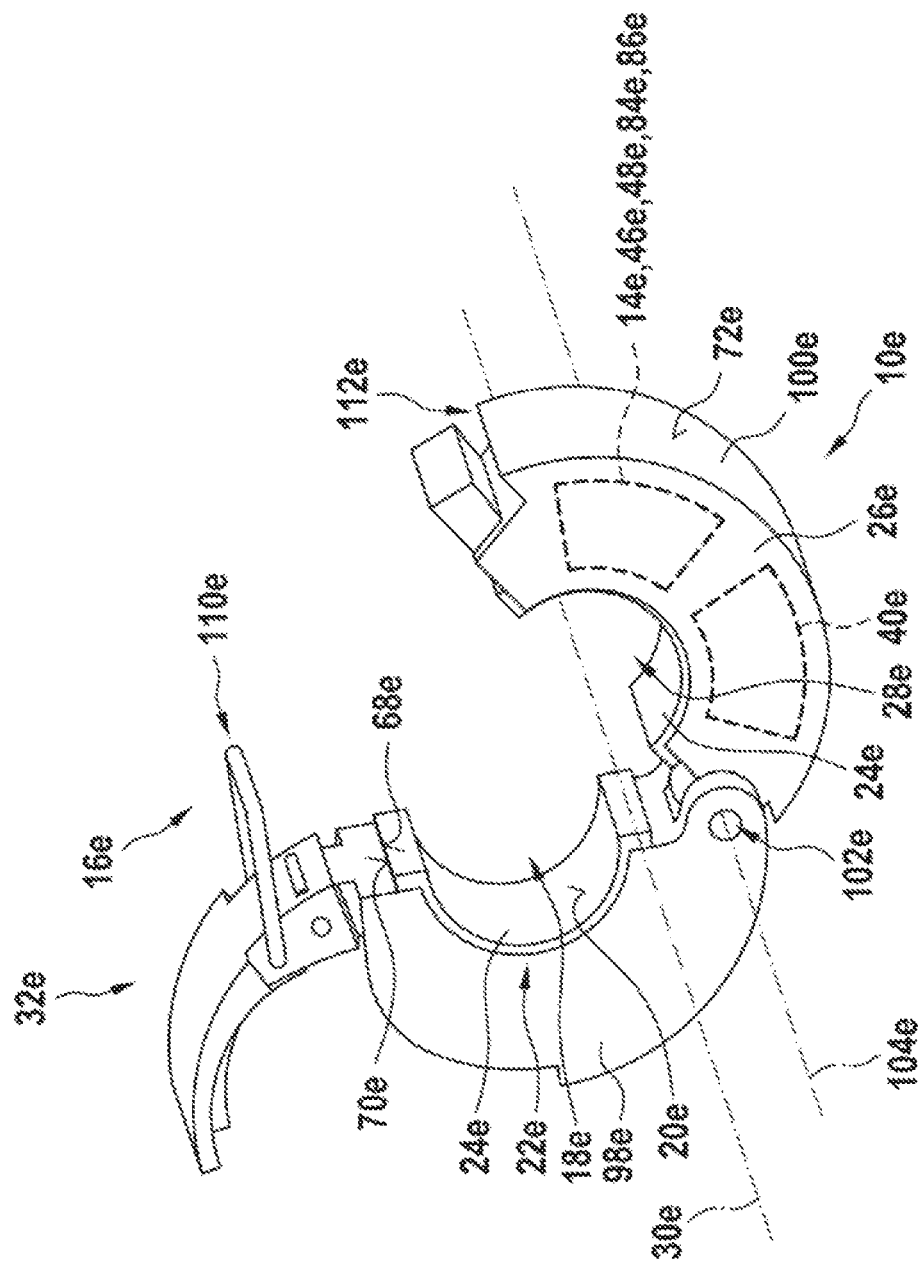

ELECTRONIC MODULE AND INSERT TOOL SYSTEM COMPRISING SUCH AN ELECTRONIC MODULE

This application claims priority under 35 U.S.C. § 119 to patent application no. DE 10 2020 216 454.1, filed on Dec. 22, 2020 in Germany, the disclosure of which is incorporated herein by reference in its entirety.

BACKGROUND

There is already known from CN 204963887 U an electronic module for an insert tool, comprising at least one electronic device for sensing insert-tool-specific characteristics, comprising at least one holding device for releasably holding the electronic device on the insert tool, the holding device having at least one insert-tool interface having at least one contact surface that, when the holding device has been arranged on the insert tool, is in contact with the insert tool, and comprising at least one damping unit for damping vibrations acting on the electronic device.

SUMMARY

The disclosure is based on an electronic module for an insert tool, in particular a drill bit or a chisel, comprising at least one electronic device for processing and/or sensing insert-tool-specific characteristics, comprising at least one holding device for releasably holding the electronic device on the insert tool, the holding device having at least one insert-tool interface having at least one contact surface that, when the holding device has been arranged on the insert tool, is in contact, in particular in direct contact, with the insert tool, and comprising at least one damping unit for damping vibrations acting on the electronic device.

It is proposed that the damping unit at least partially constitute the insert-tool interface. Preferably, the damping unit is designed to damp vibrations from the insert tool acting on a housing of the holding device in which the electronic device is arranged. "Designed" is to be understood to mean, in particular, specially configured, specially programmed, specially contrived and/or specially equipped. That an object is designed for a particular function, is to be understood to mean, in particular, that the object performs this particular function in at least one application state and/or operating state. The damping unit is preferably designed to damp transmission of accelerations, occurring at the insert tool, to the housing, in particular to the electronic device, preferably by at least 50%, more preferably by at least 75%, particularly preferably by at least 90%, and most particularly preferably by at least 99%. Preferably, the damping unit is realized in such a manner that damping of vibrations acting on the electronic device is effected with, at the same time, insert-tool-specific characteristics being able to be sensed by means of the electronic device. In addition the damping unit is designed, in particular, to counteract transmission of heat from the insert tool to the housing, in particular to the electronic device. Preferably, the damping unit is designed to enable a relative movement, in particular at least an axial relative movement, of the electronic device with respect to the insert tool when the holding device has been arranged on the insert tool. In particular, the damping unit is designed to enable a relative movement, preferably at least an axial relative movement, of the housing of the holding device with respect to the insert tool when the holding device has been arranged on the insert tool. Preferably, the damping unit is designed to enable a relative movement, in particular at least an axial relative movement, of the housing, in particular of the electronic device, with respect to the insert tool when arranged on the insert tool. In particular, the contact surface of the insert-tool interface, which, when the holding device has been arranged on the insert tool, is in direct contact with the insert tool, is at least partially constituted by the damping unit. Preferably, the contact surface of the insert-tool interface, which, when the holding device has been arranged on the insert tool, is in direct contact with the insert tool, is at least substantially completely constituted by the damping unit. "At least substantially completely" is to be understood to mean, in particular, at least 50%, preferably at least 75%, and more preferably at least 90% of a total surface, of a total volume and/or of a total mass of an object, in particular of the contact surface. The contact surface, in particular when the holding device has been arranged on the insert tool, bears against an external surface of the insert tool. Preferably, the damping unit comprises at least one damping element. The damping element is preferably realized as elastomer, spring, textile or the like. The damping element is realized, for example, in the manner of a cube, in the manner of a circular ring segment, having the shape of a plate or the like. The damping element preferably constitutes the contact surface of the insert-tool interface. It is also conceivable for the damping unit to comprise at least two damping elements or a multiplicity of damping elements. It is conceivable for the contact surface of the insert-tool interface to be constituted by one of the damping elements, by a plurality of damping elements or by all damping elements. Preferably, the damping elements are identical to one another. It is also conceivable for the damping elements to be different from one another. It is conceivable for the damping elements to be arranged spaced apart from one another, at least in an operating state. The at least one damping element is connected, in particular releasably connected, to the holding device, in particular to the housing of the holding device. "Releasably" in this context is to be understood to mean, in particular, "non-destructively separable". Preferably, the at least one damping element is at least non-positively or positively connected to the housing. It is conceivable that at least the one damping element can be attached to the holding device, for example by means of a clamping connection, a latch-in connection, a screw connection, a hook-and-loop connection or the like. Alternatively, it is also conceivable for the at least one damping element to be realized integrally with the holding device, in particular the housing. "Integrally" is to be understood to mean, in particular, connected at least in a materially bonded manner, for example by a welding process, an adhesive process, an injection process and/or another process considered appropriate by persons skilled in the art, and/or, advantageously, understood as being formed in one piece such as, for example, by being produced from a casting and/or by being produced in a single or multi-component injection process and, advantageously, from a single blank. By means of the holding device, the electronic device can preferably be non-destructively detached from the insert tool. Preferably, the holding device, which is designed for releasably holding the electronic device on the insert tool, is configured for repeated detaching/attaching of the electronic device and/or of the housing from/to the insert tool and/or another insert tool.

In particular, when the holding device has been arranged on the insert tool, by means of the housing the damping unit, preferably at least the one damping element, may be clamped, gripped and/or fixed between the housing and the insert tool. Preferably, the holding device is designed to releasably attach the electronic device to the external surface of the insert tool. The holding device comprises, in particular, at least one holding unit, which is designed to attach and/or detach the insert tool to/from the insert-tool interface in a receiving region for the insert tool that is at least partially delimited by the damping unit. The holding unit is realized, for example, as a clamping connection, a latch-in connection, a screw connection or the like.

Advantageously, the electronic module according to the disclosure can provide a particularly robust and easily mountable retrofit solution for a multiplicity of different commercially available insert tools. Advantageously, an electronic module can be attached to an insert tool in a particularly secure manner. It is advantageously possible to achieve particularly efficient protection of the holding device and/or of the electronic device against impacts. Advantageously, the damping unit can allow a relative movement of the housing with respect to the insert tool. Advantageously, the damping unit can counteract transmission of heat from the insert tool to the electronic device.

It is furthermore proposed that the damping unit have at least one damping element, in particular the aforementioned damping element, which at least is designed in the manner a circular ring segment and constitutes the contact surface of the insert-tool interface. In particular, a contour of the contact surface corresponds to a contour of the external surface of the insert tool against which the holding device, in particular the contact surface of the at least one damping element, bears when the holding device has been arranged on the insert tool. In particular, the contact surface constituted by the at least one damping element is curved. Preferably, a curvature of the contact surface corresponds to a curvature of the external surface of the insert tool. It is also conceivable for the contact surface constituted by the at least one damping element to be flat, in particular without curvature, in particular in the case of an insert tool that has a polygonal cross-section in a region on which the electronic device can be arranged. For example, the at least one damping element has a cross-section corresponding to a whole circular ring or a circular ring segment. Preferably, the damping element is realized as an O-ring, as an O-ring segment, as a hollow cylinder, as a hollow-cylinder part, in particular a hollow-cylinder half or the like. It is conceivable for at least two damping elements of the damping unit together, when the holding device has been arranged on the insert tool, to have a cross-section corresponding to a whole circular ring. In particular, it is conceivable for at least two damping elements of the damping unit together, when the holding device has been arranged on the insert tool, to form a closed O-ring or a hollow cylinder. Preferably, at least the damping element, in particular realized in the manner of a segment of a circle, is made of elastomer, in particular of rubber, or of a textile material. Advantageously, particularly efficient and uniform damping of the electronic device can be achieved. Advantageously, particularly reliable attachment of the electronic module to an insert tool can be achieved.

It is furthermore proposed that the holding device comprise a housing, in particular the aforementioned housing, in which the electronic device is arranged, the damping unit, in particular at least one damping element of the damping unit, in particular the aforementioned damping element constituting the contact surface of the insert-tool interface, being arranged on a side of the housing that faces toward the insert tool when the holding device has been arranged on the insert tool. The housing preferably has a cross-section that, at least when the holding device has been arranged on the insert tool, corresponds to a circular ring segment, a circular ring or the like. The housing is designed, for example, in the form of a cylinder, in particular in the manner of a circular segment, dome or the like. It is also conceivable for the housing to be of a spherical design. Particularly preferably, the housing has at least one inner housing external surface that, when the holding device has been arranged on the insert tool, is arranged on the side of the housing that faces toward the insert tool. Preferably, the damping unit, in particular at least the one damping element, bears against the inner housing external surface at least in an operating state. The at least one damping element has, in particular, at least one housing contact surface against which the housing, in particular the inner housing external surface, bears at least in an operating state. A contour of the housing contact surface preferably corresponds to a contour of the inner housing external surface, against which the housing contact surface bears at least in an operating state. It is conceivable for the housing contact surface and/or the inner housing external surface to have, at least partially, a round and/or a polygonal contour. In particular, the housing has an outer housing external surface, arranged on a side of the housing that faces away from the side of the housing on which the inner housing external surface is arranged. A contour of the outer housing external surface is at least partially round, oval and/or polygonal, for example. It is conceivable for the outer housing external surface to have a rectangular, in particular square, contour. Advantageously, damping of the housing, and thus of the electronic device, can be achieved. Advantageously, the possibility of a particularly accurately fitting connection of the housing to the damping unit enables particularly efficient protection of the electronic device to be achieved. Advantageously, a particularly reliable connection of the holding device to the insert tool can be achieved.

It is further proposed that the insert-tool interface, in particular the damping unit, at least partially surround a receiving region, in particular the aforementioned receiving region, for the insert tool, the holding device and the damping unit, at least in an operating state, having a common center of mass, and/or a central axis of the receiving region intersecting a center of mass of the holding device and of the damping unit, at least as viewed in a plane perpendicular to the central axis. A "center of mass" of a body/a plurality of bodies is to be understood to mean, in particular, the mass-weighted average of the positions of its/their mass points. The holding device and the damping unit, in an operating state, preferably have at least one common center of mass, and/or the central axis of the receiving region intersects a center of mass of the holding device and a center of mass of the damping unit, at least as viewed in a plane perpendicular to the central axis, in order to achieve unbalance compensation in the case of an insert tool that is driven in a rotating and/or percussive manner in an operating state. It is conceivable for the receiving region to be completely surrounded by the damping unit, in particular at least as viewed along a circumferential direction of the receiving region. The circumferential direction of the receiving region extends, in particular, in a plane perpendicular to the central axis of the receiving region. It is also conceivable for the receiving region to be partially surrounded by the damping unit, in particular at least as viewed along the circumferential direction of the receiving region. Preferably, the receiving region, at least along the circumferential direction of the receiving region, is at least partially delimited by the damping unit. Particularly preferably, the receiving region, at least along the circumferential direction of the receiving region, is completely delimited by the damping unit. Moreover, it is conceivable for the damping unit, in particular the contact surface, and/or the holding device, in particular the inner housing external surface, to completely surround and/or delimit the receiving region, at least as viewed along the circumferential direction of the receiving region. Preferably, the damping unit and/or the holding device are/is arranged symmetrically around the central axis of the receiving region, in particular at least with respect to a weight distribution and/or a spatial extent. It is conceivable for the respective center of mass of the damping unit and of the holding device each to be arranged offset with respect to the central axis of the receiving region, at least as viewed in the plane perpendicular to the central axis, the centers of mass of the holding device and of the damping unit taken together being located on the central axis of the receiving region. Advantageously, an electronic module can be provided that causes a particularly small amount of unbalance to be exerted on the insert tool. Advantageously, a particularly efficient and uniform damping of the electronic device can be achieved with, at the same time, particularly little influence on operation of the insert tool.

It is additionally proposed that the holding device comprise at least one holding unit, in particular the aforementioned holding unit, which is designed for attaching and/or detaching the insert tool to/from the insert-tool interface without use of tools, in a receiving region for the insert tool, in particular the aforementioned receiving region, that is at least partially delimited by the damping unit. It is conceivable for the holding unit to be realized as a bayonet lock, as a ratchet lock, as a clamping cap, as a clip lock or the like. Alternatively, it is also conceivable for the holding unit to be realized as a screw lock. Preferably, the insert tool can be attached/detached to/from the insert-tool interface in the receiving region, that is at least partially delimited by the damping unit, without the use of tools. In particular, the holding unit is configured to be detached and/or attached manually, in particular without use of any additional tool. In particular, the insert tool can be manually attached/detached to/from the insert-tool interface in the receiving region for the insert tool by means of the holding unit. Preferably, insert tools of different sizes, in particular different diameters, can be attached to the insert-tool interface in the receiving region by means of the holding unit and/or the damping unit. Preferably, a maximum diameter of the receiving region can be varied at least via a material thickness of the at least one damping element that, in particular, at least partially constitutes the contact surface. Additionally or alternatively, it is conceivable for the holding unit to be designed to be adjustable for the purpose of attaching insert tools of different sizes, in particular different diameters. Preferably, the holding unit is designed to be adjustable in such a manner that a maximum diameter of the receiving region for the insert tool can be varied, in particular at least in an embodiment of the holding unit realized as a ratchet lock, screw lock and/or clip lock. Particularly preferably, a holding force of the insert tool at the insert-tool interface in the receiving region is adjustable via the holding unit and/or the damping unit. The holding force of the insert tool at the insert-tool interface in the receiving region is preferably adjustable at least by a choice of material, in particular elasticity and/or hardness, a material thickness or the like, of the at least one damping element. Advantageously, a damped electronic module can be arranged on an insert tool in a particularly convenient manner. Advantageously, a damped electronic module can be particularly conveniently attached to and/or used on different insert tools.

It is furthermore proposed that the holding device comprise at least one holding unit realized as a bayonet lock, which is designed for releasably attaching the insert tool to the insert-tool interface in a receiving region for the insert tool, in particular the aforementioned receiving region, that is at least partially delimited by the damping unit. Preferably, at least a part of the bayonet lock is arranged on the housing. It is conceivable for the bayonet lock to be realized integrally with the housing, at least partially. The bayonet lock is designed, in particular, to clamp the housing, at least axially, to the damping unit. Preferably, when the bayonet lock has been closed, in particular also when the holding device has been released from the insert tool, the damping unit is captively arranged on and/or in the holding device. Advantageously, a particularly secure axial fixing of the electronic module to the insert tool can be achieved.

It is furthermore proposed that the bayonet lock comprise at least one metallic locking ring. In particular, the metallic locking ring comprises at least one positive locking element, preferably at least two positive locking elements, more preferably at least four positive locking elements, at least at/on an external ring surface. In particular, the external ring surface extends at least substantially parallel to the inner housing external surface, to the outer housing external surface and/or to the central axis of the receiving region, preferably at least in an operating state. Preferably, the at least one positive locking element of the locking ring is realized as a projection or the like. The bayonet lock preferably comprises at least one further positive locking element, more preferably at least two further positive locking elements, particularly preferably at least four further positive locking elements, which are arranged in particular on the housing, particularly preferably are realized integrally with the housing. The at least one further positive locking element is preferably realized as a projection receiver. It is also conceivable for the at least one positive locking element to be realized as a projection receiver, and for the at least one further positive locking element to be realized as a projection. In particular, the at least one positive locking element of the locking ring is designed to act in combination with the at least one further positive locking element for the purpose of attaching the locking ring to the housing. The at least one further positive locking element, realized as a projection receiver is designed, in particular, to receive the at least one positive locking element, realized as a projection for the purpose of attaching the locking ring to the housing. In particular, the bayonet lock is closable, in the case of a corresponding axial distance between the housing and the locking ring, by a rotation of the locking ring relative to the housing, in particular by a rotation about a longitudinal axis of the insert tool. It is conceivable for the housing to be at least partially made of a plastic and/or at least partially made of a metal. Particularly preferably, the housing is made at least substantially entirely of a plastic. Alternatively, it is also conceivable for the locking ring to be made of a plastic or the like. Advantageously, particularly reliable attachment of an electronic module to an insert tool can be realized, which at the same time does not harm the electronic device.

It is additionally proposed that the damping unit comprise at least one damping element, in particular the aforementioned damping element, realized as a shrink-on sleeve. In particular, the damping element realized as a shrink-on sleeve is designed to be applied to the insert tool, in particular to the external surface of the insert tool. Preferably, the damping element realized as a shrink-on sleeve is designed to be applied to the insert tool, in particular to the external surface of the insert tool, by means of a hot air flow.

The damping element realized as a shrink-on sleeve comprises, for example, an adhesive layer that in particular is intended to be fused-on when the damping element is being attached to the insert tool. Preferably, the adhesive layer can be fused-on by means of a hot air flow and/or by a previously generated heating of the insert tool. There is preferably an elevation, in particular a rim, realized on an outer side of the damping element realized as a shrink-on, on which in particular the housing contact surface is arranged. The elevation preferably extends at least partially, for example in sections, particularly preferably completely, along a circumferential direction of the damping element. The circumferential direction of the damping element realized as a shrink-on sleeve extends in particular in a plane perpendicular to the central axis of the receiving region. The elevation is designed, in particular, to at least partially delimit and/or damp at least an axial movement of the housing relative to the damping element realized as a shrink-on sleeve and/or to the insert tool, at least in an operating state. Advantageously, particularly secure holding of the electronic module on an insert tool can be realized, while at the same time particularly reliable protection, in particular damping, of the electronic device is rendered possible.

It is furthermore proposed that the damping unit comprise at least one damping element, in particular further damping element, realized as an O-ring. Preferably, at least in the case of a holding unit realized as a bayonet lock, the damping unit comprises the damping element realized as a shrink-on sleeve and the further damping element realized as an O-ring. The damping element realized as an O-ring preferably encloses the damping element realized as a shrink-on sleeve, at least in an operating state, in particular at least as viewed along the circumferential direction of the damping element. The damping element realized as a shrink-on sleeve and/or the damping element realized as an O-ring, at least in an operating state, are/is preferably arranged, in particular when the bayonet lock has been closed, on a side of the housing that faces toward the receiving region, particularly preferably in a captive manner. Preferably, the damping element realized as an O-ring, at least in an operating state, is arranged between the damping element realized as a shrink-on sleeve and the housing. It is conceivable for the damping element realized as a shrink-on sleeve and/or the damping element realized as an O-ring to at least partially constitute the contact surface. A maximum diameter of a region constituted by the inner housing external surface is smaller, at least at one location, than a maximum outer diameter of the damping element realized as an O-ring. The damping element realized as an O-ring is preferably designed to at least partially delimit and/or damp at least an axial movement of the housing relative to the damping element realized as an O-ring and/or to the insert tool, at least in an operating state. For the purpose of damping and/or delimiting an axial movement of the housing relative to the insert tool in at least one operating state, the damping element realized as an O-ring is preferably designed to act in combination with the damping element realized as a shrink-on sleeve, in particular with the elevation, and/or with a housing external surface of the housing. Advantageously, particularly effective damping of the electronic device can be achieved.

It is also proposed that the damping unit realize the insert-tool interface in such a manner that the damping unit, when the insert tool has been arranged at the insert-tool interface, is designed at least to damp vibrations, acting on the electronic device, that can be caused by impacts or shocks of the insert tool acting along a longitudinal axis, in particular axis of rotation, of the insert tool, in particular the aforementioned longitudinal axis. Preferably, the electronic device and/or the housing can be attached to the insert tool via the damping unit and the holding unit in such a manner that, preferably upon the occurrence of impacts and/or shocks to the insert tool, the holding device, in particular the housing, and/or the electronic device can be moved relative to the insert tool at least axially, in particular parallel to the longitudinal axis and/or the central axis. In particular, the axial movability of the holding device, in particular of the housing, and/or of the electronic device relative to the insert tool when the holding device has been arranged on the insert tool is adjustable via the holding force that can be generated by the damping unit and/or the holding unit. Advantageously, at least one axial relative movement of the electronic device, in particular of the housing and/or of the holding device, relative to the insert tool can be at least partially enabled, such that damage to the electronic module, resulting from impacts on the insert tool, can be counteracted.

Additionally proposed is an insert tool system comprising at least one insert tool, in particular the aforementioned insert tool, and comprising at least the electronic module according to the disclosure. Preferably, the insert tool is designed for a hand-held power tool. It is conceivable that, as a result of the electronic module being attached to the insert tool, the insert tool can be integrated into an internet-of-things network. The hand-held power tool is realized, for example as a power drill, a hammer drill, a percussion hammer, a chipping hammer or the like. Preferably, the hand-held power tool has at least one insert-tool receiver, in which or to which the insert tool can be attached. It is conceivable that the insert tool can be driven by the hand-held power tool. It is conceivable for the hand-held power tool to be configured to drive the insert tool in a rotational motion, in particular about a longitudinal axis of the insert tool. Additionally or alternatively, it is conceivable for the hand-held power tool to comprise an impact mechanism for driving the insert tool in an impact mode. An impact on the insert tool, generated by the impact mechanism, is preferably effected along the longitudinal axis of the insert tool. Preferably, the insert tool has a circular cross-section. It is also conceivable, however, for the insert tool to have a polygonal cross-section. The insert tool is preferably realized as a drill bit or a chisel. It is also conceivable, however, for the insert tool to be realized as another insert tool considered appropriate by persons skilled in the art. Preferably, the insert tool is realized without any special design, in particular without any special preparation/modification, for connection to the holding device. Advantageously, it is possible for the electronic module to be attached to insert tools of different manufacturers.

Advantageously, an insert tool can be provided, in a particularly convenient manner, with a particularly robust and durable electronic module that can be releasably attached to the insert tool.

It is furthermore proposed that the damping unit, when the electronic module has been arranged on the insert tool, bears directly against the insert tool, in particular against an external surface of the insert tool, in particular the aforementioned external surface. Advantageously, a particularly uniform damping and/or axial relative movement with respect to the insert tool of the electronic device and/or the holding device, in particular of the housing, can be achieved.

It is furthermore proposed that the insert tool, at least when the electronic module has been arranged on the insert tool, is at least substantially completely enclosed by the damping unit and the holding device, at least as viewed along a circumferential direction of the insert tool. The circumferential direction of the insert tool extends, in particular, in a plane perpendicular to the longitudinal axis, in particular the axis of rotation, of the insert tool. Preferably, the longitudinal axis of the insert tool is at least substantially parallel to the central axis of the receiving region, at least when the holding device has been arranged on the insert tool. "Substantially parallel" is to be understood here to mean, in particular, an alignment of a direction relative to a reference direction, in particular in one plane, the direction deviating with respect to the reference direction by, in particular, less than 8°, advantageously less than 5°, and particularly advantageously less than 2°. The longitudinal axis, in particular the axis of rotation, preferably corresponds to an axis of main extent of the insert tool. An "axis of main extent" of an object is to be understood in this case, in particular, as an axis that is parallel to a longest edge of a smallest geometric cuboid that just completely encloses the object. Advantageously, particularly effective damping of vibrations acting on the electronic device can be achieved with, at the same time, particularly secure holding of the electronic module on the insert tool.

The disclosure is furthermore based on an electronic module, in particular the aforementioned or an alternative electronic module, for an insert tool, in particular the aforementioned, insert tool, comprising at least one electronic device, in particular the aforementioned electronic device, for processing and/or sensing insert-tool-specific characteristics, the electronic device comprising at least one identification unit for identifying the insert tool, and comprising at least one holding device, in particular the aforementioned holding device, for releasably holding the electronic device on the insert tool, in particular on an external surface of the insert tool, in particular the aforementioned external surface.

It is proposed that the electronic device have at least one sensing unit designed to actively sense at least one insert-tool-specific characteristic, in particular at least for the purpose of ascertaining a wear condition and/or a fall event of the insert tool. The sensing unit preferably comprises a multiplicity of different sensors, in particular to sense a multiplicity of different insert-tool-specific characteristics. It is also conceivable, however, for the sensing unit to comprise only one sensor to sense an insert-tool-specific characteristic of the insert tool. The sensing unit comprises, for example, at least one of a temperature sensor, a motion sensor, an optical sensor, an acoustic sensor, a locating sensor, a moisture sensor, and/or the like. The at least one insert-tool-specific characteristic is realized, for example, as a temperature characteristic, a motion characteristic, an optical characteristic, an acoustic characteristic, a position characteristic, a moisture characteristic or the like. Preferably, the electronic device and/or an external device comprise/comprises an open-loop or closed-loop control unit for processing data sensed by means of the sensing unit relating to the at least one insert-tool-specific characteristic. An "open-loop or closed-loop control unit" is to be understood to mean, in particular, a unit comprising at least one set of control electronics. A "set of control electronics" is to be understood to mean, in particular, a unit having a processor unit and having a memory unit, and having an operating program stored in the memory unit. Preferably, the open-loop or closed-loop control unit has at least one, in particular wireless and/or wireless, communication interface that preferably can be used at least for updating the operating program. It is conceivable for the open-loop or closed-loop control unit/s of the electronic device and/or of the external device to be at least partly based on artificial intelligence, and in particular configured for machine learning. For example, the open-loop or closed-loop control unit/s of the electronic device and/or of the external device process data sensed by means of the sensing unit, at least partly by means of a self-learning algorithm. The external device is configured, for example, as a laptop, a hand-held power tool, a cloud server, a smartphone, a computer or the like. In particular, data can be transmitted between the electronic device and the external device, for example via a communication unit of the electronic device. It is conceivable for the communication unit to be configured for wireless and/or wired data exchange between the electronic device and the external device. The communication unit comprises, for example, a WLAN module, a Bluetooth low-energy module, a Zigbee module or another communication module considered appropriate by persons skilled in the art. Preferably, the components and/or units of the electronic device, in particular at least the sensing unit, the communication unit and/or the open-loop or closed-loop control unit, are arranged at least partially, preferably largely, on/on a common printed circuit board. Preferably, the at least one insert-tool-specific characteristic is designed to be evaluated for the purpose of ascertaining a wear condition and/or a fall event of the insert tool, preferably by means of the open-loop or closed-loop control unit. Preferably, a wear condition and/or a fall event of the electronic module, in particular of the electronic device, can be ascertained in dependence on the at least one insert-tool-specific characteristic, in particular by means of the open-loop or closed-loop control unit of the external device and/or of the electronic device. The open-loop or closed-loop control unit/s of the electronic device and/or of the external device are/is configured in particular to ascertain from data, ascertained by means of the sensing unit, relating to the at least one insert-tool-specific characteristic, at least one usage characteristic of the insert tool, for example a duration of use, a type of use, a number of uses, in particular a number of drilled holes or the like, an intensity of use or the like. It is also conceivable for the open-loop or closed-loop control unit of the electronic device and/or of the external device to be configured to calculate and accumulate on the basis of data sensed by means of the sensing unit relating to the at least one insert-tool-specific characteristic, in particular by means of algorithms, for example a drilling time, a number of drilled holes or the like. For example, calculation/accumulation of a usage characteristic, in particular of the drilling time and of the number of drilled holes, is effected by the open-loop or closed-loop control unit of the electronic device and/or of the external device by means of a moving average, an envelope of sensed values of the at least one insert-tool-specific characteristic, in particular of the sensed acceleration values, and/or use of selective amplitude values, wherein amplitudes can be converted in particular by means of an RMS value. Ascertainment of a fall event, in particular a free fall event, of the insert tool is preferably based on an algorithm that detects a change in an acceleration of the insert tool with respect to the acceleration due to gravity, wherein sensed acceleration values can preferably be converted by means of an RMS value, such that, in particular, a moving average can be formed and can be compared with a range of values, in particular a threshold value, that is preferably stored on a database. The open-loop or closed-loop control unit/s of the electronic device and/or of the external device are/is preferably configured to ascertain, in dependence on data sensed by means of the sensing unit relating to the at least one insert-tool-specific characteristic, in particular in dependence on the at least one usage characteristic, a wear condition of the insert tool, a fall event of the insert tool or the like. It is also conceivable that, in dependence on data sensed by means of the sensing unit relating to the at least one insert-tool-specific characteristic, in particular in dependence on the at least one usage characteristic, the wear condition and/or ascertained fall events, automatic ordering and/or delivery of spare parts or the like can be performed, for example by transmission of the sensed and/or evaluated data to the external device, for example realized as a cloud server, by means of the communication unit. It is also conceivable that, in dependence on data sensed by means of the sensing unit relating to the at least one insert-tool-specific characteristic, in particular in dependence on the at least one usage characteristic, a material of the workpiece on which work is performed by the insert tool can be ascertained, preferably by means of the open-loop or closed-loop control unit of the electronic device and/or of the external device. Preferably, the sensing unit is different from a transmitter module that is configured to emit and/or transmit insert-tool-specific data already stored in a memory of the transmitter module. In particular, the sensing unit differs in design from an RFID tag configured to emit and/or transmit an already stored identifier of an insert tool.

It is conceivable for the identification unit of the electronic device to be realized as an RFID tag. It is also conceivable for the identification unit to be constituted by the sensing unit, the sensing unit preferably being configured to actively sense an insert-tool-specific characteristic realized as an identification characteristic of the insert tool. It is conceivable for the insert-tool-specific characteristic realized as an identification characteristic to be designed to be evaluated for the purpose of identifying the insert tool, preferably by means of the open-loop or closed-loop control unit of the electronic device and/or of the external device. Preferably, a digital data sheet is assignable to the insert tool by means of an identification. The digital data sheet comprises, for example, a product identifier, an insert-tool type, an insert-tool diameter, manufacturer information, a date of manufacture, an insert-tool material or the like. Preferably, information relating to an identification of the insert tool on which the electronic device, in particular, is arranged can be stored on/retrieved from a memory unit of the electronic device. Advantageously, a particularly high degree of customer benefit can be realized. Advantageously, a commercially available insert tool can be particularly easily and rapidly integrated into an internet-of-things network. Advantageously, in sensing of the at least one insert-tool-specific characteristic, a distance between the sensing unit and the insert tool can be kept particularly small. Advantageously, a particularly precise measurement of the at least one insert-tool-specific characteristic can be effected. Advantageously, a condition of the insert tool can be monitored in a particularly precise and convenient manner. Advantageously, a particularly efficient usage of an insert tool can be supported. By means of the sensing unit, damage to and/or failures of the insert tool can be sensed automatically in a particularly rapid and/or reliable manner.

It is also proposed that the sensing unit comprise at least one temperature sensor, in particular the aforementioned temperature sensor, which is designed to sense at least one insert-tool-specific characteristic realized as a temperature characteristic of the insert tool, when the electronic device has been arranged on the insert tool, in particular at least for the purpose of ascertaining a wear condition of the insert tool. Preferably, the temperature characteristic is a temperature of the insert tool. It is also conceivable for the temperature characteristic to be, for example, a rotational speed or the like from which a temperature of the insert tool and/or of the electronic device can be ascertained, preferably by means of the open-loop or closed-loop control unit. The temperature sensor is realized, for example, as a negative temperature coefficient thermistor, a positive temperature coefficient thermistor, an integrated semiconductor temperature sensor, a diode, a temperature sensor with oscillating quartz, a thermocouple or another temperature sensor considered appropriate by persons skilled in the art. For the purpose of sensing a temperature characteristic realized as a rotational speed or the like, the temperature sensor is preferably realized as a speed sensor or acceleration sensor considered appropriate by persons skilled in the art. In addition, it is conceivable for the temperature sensor to be configured to sense a temperature characteristic of the electronic device. It is conceivable that a temperature characteristic, in particular a temperature, of the electronic device can be ascertained in dependence on the insert-tool-specific characteristic realized as a temperature characteristic of the insert tool, preferably by means of the open-loop or closed-loop control unit of the electronic device and/or of the external device. In particular, a temperature gradient can be ascertained on the basis of sensed data relating to the insert-tool-specific characteristic realized as a temperature characteristic, preferably by means of the open-loop or closed-loop control unit of the electronic device and/or of the external device. For example, information relating to a use of the insert tool, to the workpiece on which work is performed by means of the insert tool, in particular a material of the workpiece on which work is performed, and/or a duration of a work operation with the insert tool, in particular a drilling operation or the like, can be ascertained in dependence on the ascertained temperature gradient, preferably by means of the open-loop or closed-loop control unit of the electronic device and/or of the external device. Advantageously, a temperature characteristic, in particular a temperature, of the insert tool and/or of the electronic device can be sensed, monitored or ascertained. Advantageously, at least one wear condition of the insert tool can be ascertained in dependence on an insert-tool-specific characteristic realized as a temperature characteristic of the insert tool that can be sensed by means of the sensing unit.

It is additionally proposed that the sensing unit comprise at least one motion sensor, which is designed to sense at least one insert-tool-specific characteristic realized as a motion characteristic of the insert tool, when the electronic device has been arranged on the insert tool, in particular at least for the purpose of ascertaining a wear condition and/or a fall event of the insert tool. The motion characteristic may be, for example, an acceleration, a rotational speed, a vibration, a position/orientation or the like of the insert tool. The motion sensor is realized, for example, as a MEMS sensor, a piezoelectric sensor, or another motion sensor considered appropriate by persons skilled in the art. For example, a motion sensor realized as an acceleration sensor is configured to sense, in particular at least when the electronic device has been arranged on the insert tool, preferably at a specific sampling rate, acceleration amplitudes occurring during use of the insert tool, preferably in all three spatial directions. For example, at least in dependence on an acceleration characteristic realized as an acceleration, a fall event of the insert tool can be ascertained, preferably by means of the open-loop or closed-loop control unit of the electronic device and/or of the external device. It is also conceivable that, on the basis of data, ascertained by means of the motion sensor, relating to the at least one motion characteristic, a number of drilling operations performed, an operating time of the insert tool or the like can be ascertained, in particular a wear condition of the insert tool being ascertainable in dependence thereon, particularly preferably by means of the open-loop or closed-loop control unit of the electronic device and/or of the external device. Preferably, in dependence on the insert-tool-specific characteristic realized as an acceleration characteristic, an improper use of the insert tool, for example occurring impacts or the like, can be ascertained, in particular by means of the open-loop or closed-loop control unit of the electronic device and/or of the external device. Advantageously, a motion characteristic, in particular an acceleration, in particular a rotational speed, of the insert tool and/or of the electronic device can be sensed, monitored and/or ascertained. Advantageously, at least one wear condition of the insert tool can be ascertained in dependence on an insert-tool-specific characteristic realized as a motion characteristic of the insert tool that can be sensed by means of the sensing unit.

It is furthermore proposed that the sensing unit comprise at least one optical sensor, which is designed to sense at least one insert-tool-specific characteristic realized as an optical characteristic of the insert tool, at least when the electronic device has been arranged on the insert tool, in particular at least for the purpose of identifying the insert tool and/or for the purpose of ascertaining a wear condition of the insert tool. The optical characteristic is preferably an optical signal, for example visible light, infrared radiation, UV radiation or the like. It is conceivable for the optical sensor to be realized as a radar sensor, a LIDAR sensor, a SAR sensor, a laser sensor, as a camera sensor, or as another optical sensor considered appropriate by persons skilled in the art. It is conceivable that data sensed by means of the optical sensor, in particular at least relating to the insert-tool-specific characteristic realized as an optical characteristic, can be processed in an imaging process, preferably by means of the open-loop or closed-loop control unit of the electronic device and/or of the external device. Preferably, the optical sensor is designed to sense an identification code arranged on the insert tool, for example an alphanumeric code, a barcode, a QR code or the like. In particular, the insert tool is identifiable, preferably by means of the open-loop or closed-loop control unit of the electronic device and/or the external device, in dependence on the identification code that is sensed by means of the optical sensor and arranged on the insert tool. It is also conceivable that the insert tool is identifiable, preferably by means of the open-loop or closed-loop control unit of the electronic device and/or the external device, on the basis of data sensed by means of the optical sensor relating to the at least one optical characteristic and processed, in particular, in an imaging process. It is conceivable that the data sensed by means of the optical sensor relating to the at least one optical characteristic, can be compared, preferably by means of the open-loop or closed-loop control unit of the electronic device and/or of the external device, with a database on which preferably at least reference data relating to the optical characteristic, which in particular correspond to an insert tool in new condition, are stored. Preferably, a wear condition of the insert tool can be ascertained on the basis of the comparison. Additionally or alternatively, it is conceivable for the sensing unit, in particular the optical sensor, to be configured to automatically sense an insert tool arranged on the hand-held power tool, in particular on or in the insert-tool receiver. It is conceivable for a time-point of attachment of the insert tool to the hand-held power tool to be stored. It is also conceivable that an attachment duration of the insert tool to the hand-held power tool and/or a detaching of the insert tool from the insert tool machine can be sensed by means of the sensing unit, preferably automatically, and in particular can be stored by the electronic device, in particular on the memory unit of the electronic device. Advantageously, a condition of the insert tool can be sensed, monitored and/or ascertained via an optical signal of the insert tool sensed by means of the sensing unit. Advantageously, an optical signal of the insert tool sensed by means of the sensing unit can be used to identify the insert tool.

It is furthermore proposed that the sensing unit comprise at least one acoustic sensor, which is designed to sense at least one insert-tool-specific characteristic realized as an acoustic characteristic of the insert tool, when the electronic device has been arranged on the insert tool, in particular for the purpose of ascertaining a wear condition of the insert tool. Preferably, the insert-tool-specific characteristic realized as an acoustic characteristic is an acoustic signal, in particular a frequency and/or a volume, generated by the insert tool during operation. Preferably, the insert-tool-specific characteristic realized as an acoustic characteristic can be used to ascertain a wear condition of the insert tool, preferably by means of the open-loop or closed-loop control unit of the electronic device and/or of the external device. It is conceivable that the data sensed by means of the acoustic sensor relating to the at least one acoustic characteristic can be compared, preferably by means of the open-loop or closed-loop control unit of the electronic device and/or of the external device, with a database on which preferably at least reference data relating to the acoustic characteristic, which in particular correspond to an insert tool in new condition, are stored. Particularly preferably, a wear condition of the insert tool can be ascertained on the basis of the comparison. The acoustic sensor is realized, for example, as a microphone, as an ultrasonic sensor or as another acoustic sensor considered appropriate by persons skilled in the art. Advantageously, an acoustic characteristic of the insert tool sensed by means of the sensing unit can be used to sense, monitor and/or ascertain a condition of the insert tool.

It is also proposed that the sensing unit comprise at least one locating sensor system, which is configured to sense, in particular to track in real time, in particular over an extensive area, an insert-tool-specific characteristic realized as a position characteristic of the insert tool, when the electronic device has been arranged on the insert tool. The locating sensor system is in particular configured to sense, for example by means of GPS, Bluetooth low-energy, UWB, WLAN, Zigbee or the like, a position of the insert tool when the electronic device has been arranged on the insert tool. In particular, the locating sensor system is configured to track the position characteristic, in particular the position, of the insert tool over an extensive area and/or in real time. It is also conceivable that, when the electronic device has been arranged on the insert tool, a position of the insert tool can be sensed by means of fingerprinting, gateways or the like. For example, when the electronic device has been arranged on the insert tool, a position of the insert tool may be monitored by means of the locating sensor system via a smartphone or the like. Preferably, the locating sensor system differs in design from an RFID tag. Alternatively or additionally, however, it is also conceivable that a position of the insert tool can be sensed by means of an RFID tag or the like. It is conceivable that the data sensed by means of the locating sensor system relating to the position characteristic can be evaluated for the purpose of ascertaining a wear condition, preferably by means of the open-loop or closed-loop control unit of the electronic device and/or of the external device. For example, the position characteristic can be used to ascertain improper storage, in particular excessively moist, cold or hot storage, of the insert tool and/or of the electronic device. Advantageously, an improper use of the insert tool, in particular an improper storage of the insert tool and/or the electronic device, can be ascertained on the basis of an insert-tool-specific characteristic, realized as a position characteristic, sensed by means of the sensing unit.

It is additionally proposed that the electronic device comprise at least one memory unit, in particular the aforementioned memory unit, which is configured to store at least partially, in particular automatically, data sensed by means of the sensing unit relating to the at least one insert-tool-specific characteristic. The memory unit is realized, for example, as an SSD, a RAM or the like. Preferably, the electronic device is configured to sense the at least one insert-tool-specific characteristic continuously, or automatically at time intervals. Preferably, the time intervals at which the sensing unit senses the at least one insert-tool-specific characteristic are adjustable, preferably by means of the open-loop or closed-loop control unit of the electronic device and/or of the external device. It is conceivable that the time intervals are adjustable in a stepless or steplike manner. It is also conceivable that it is possible to switch between continuous sensing and sensing at time intervals. For example, the external device and/or the electronic device comprise/s at least one input unit. It is conceivable that settings of the electronic device, in particular of the sensing unit and/or of the open-loop or closed-loop control unit, are adjustable by a user via the input unit. It is conceivable for the input unit to be arranged on the housing. It is also conceivable that information relating to the insert tool, on which the electronic device is arranged, can be entered via the input unit, in particular at least for manual identification/assignment of the insert tool. The input unit is realized, for example, as a keypad, as a setting wheel, as a touch screen or as another input unit considered appropriate by persons skilled in the art. It is also conceivable for the input unit of the electronic device to comprise a wireless or wired communication interface via which information can be entered, for example via the external device. It is also conceivable for the communication interface of the input unit to be constituted by the communication unit. It is also conceivable for the sensing unit to be configured to sense the at least one insert-tool-specific characteristic only when the insert tool is in a drive state. For example, a drive state can be communicated via the communication unit from the external device, in particular the hand-held power tool, to the electronic device, in particular the open-loop or closed-loop control unit and/or the sensing unit. It is also conceivable that a drive state of the insert tool can be sensed by the sensing unit. Preferably, the memory unit is configured to store, continuously and automatically, data sensed by means of the sensing unit relating to the at least one insert-tool-specific characteristic. It is conceivable for the memory unit to be realized as a ring memory, or to be designed to permanently store the data sensed by means of the sensing unit. Preferably, data stored on the memory unit can be read out by the open-loop or closed-loop control unit of the sensing device and/or of the external device. Advantageously, a wear condition, a fall event and/or identification of an insert tool on which the electronic module is arranged can be ascertained in a manner that is particularly flexible in respect of time and/or space.

It is furthermore proposed that the electronic device be configured to filter before storage and/or transmission, when the electronic device has been arranged on the insert tool, data sensed by means of the sensing unit relating to the at least one insert-tool-specific characteristic. Preferably, the open-loop or closed-loop control unit of the electronic device and/or of the external device is configured to filter the data sensed by means of the sensing unit relating to the at least one insert-tool-specific characteristic with an anti-alias filter or the like. It is conceivable that the sensing unit can be set in such a manner that the sensing unit senses only data relating to the at least one insert-tool-specific characteristic if these data are within a certain value range. It is also conceivable for the memory unit to be configured to store data sensed by means of the sensing unit if these are within the set value range. It is conceivable for a value range for the at least one insert-tool-specific characteristic to be stored in a database, which is preferably stored on the memory unit of the electronic device or of the external device, in dependence on which in particular the sensing unit senses data relating to the at least one insert-tool-specific characteristic and/or in dependence on which the memory unit stores data relating to the at least one insert-tool-specific characteristic sensed by means of the sensing unit. Preferably, the range of values is adjustable in such a manner that relevant values relating to the at least one insert-tool-specific characteristics can be sensed and/or stored for the purpose of ascertaining a wear condition, a fall event and/or an identification of the insert tool. Advantageously, an electronic module having particularly efficient data processing can be provided. Advantageously, a component requirement, in particular a requirement for storage capacity, for computing capacity, for energy storage capacity and/or for sensing capacity, for the purpose of ascertaining a wear condition, a fall event and/or an identification of the insert tool on the basis of data ascertained by means of the sensing unit, can be kept particularly low.

It is also proposed that the electronic device comprise at least one output unit, which is designed to output, in dependence on the at least one insert-tool-specific characteristic sensed by means of the sensing unit, in particular in dependence on the at least one usage characteristic, information that in particular includes an instruction for action and/or an instruction for use. Preferably, the output unit is arranged on the housing. Alternatively, it is also conceivable for the electronic device to be realized without an output unit. Alternatively or additionally, it is also conceivable for an output unit to be arranged on the external device. The output unit may be realized, for example, as a screen, as a loudspeaker, as an illumination unit, in particular LEDs or the like, as a laser module or the like. The information may comprise, for example, the at least one usage characteristic, a wear condition of the insert tool, information relating to fall events of the insert tool, information relating to damage, an instruction for action, work support information, an instruction for use or the like. For example, information on possible uses of the insert tool, operating instructions, warranty conditions, instructions for action or the like can be output to a user in dependence on an identification of the insert tool by means of the identification unit, in particular the sensing unit, in particular at least via the output unit of the electronic device and/or of the external device. It is conceivable that a user can be supported/advised in an ordering process in dependence on data sensed by means of the sensing unit relating to the at least one insert-tool-specific characteristic, in particular in dependence on the at least one usage characteristic, in particular via the output unit of the electronic device and/or of the external device. It is also conceivable that a retailer location, a price of an insert tool or the like can be output via the output unit of the electronic device and/or of the external device. It is conceivable for the electronic device to comprise at least one work illumination unit, which is designed to illuminate at least one work area of the insert tool. The work illumination unit is preferably arranged on the housing. It is conceivable for the work illumination unit to be releasably attached to the housing or to be fixedly connected to the housing. The work illumination unit preferably comprises at least one LED, a laser or the like. It is conceivable for the work illumination unit to be at least partially constituted by the output unit of the electronic device. Advantageously, an electronic module can be arranged on the insert tool for particularly highly efficient use of an insert tool. Advantageously, insert-tool damage can be ascertained particularly reliably and/or insert-tool damage can be counteracted.

It is furthermore proposed that the electronic device comprise at least one energy storage unit, which is designed to supply at least the sensing unit with electrical energy, electrical contacts between the sensing unit and the energy storage unit being at least partially soldered. Preferably, all electrical contacts between the energy storage unit and the sensing unit are soldered. Alternatively, it is also conceivable for at least the electrical contacts between the sensing unit and the energy storage unit not to have soldered joints. The energy storage unit is realized, for example, as an accumulator, a battery or the like. Preferably, the energy storage unit is arranged in the housing. The electronic device, in particular the energy storage unit, preferably comprises at least one charging terminal by means of which the energy storage unit can be charged. Alternatively, it is also conceivable for the electronic module to be realized without a charging terminal. Preferably, the energy storage unit is arranged on a side of the housing that is opposite a side on which at least the sensing unit and/or the open-loop or closed-loop control unit are/is arranged, at least as viewed from the central axis of the receiving region. Also conceivable, alternatively, are other arrangements of the energy storage unit relative to the sensing unit and/or to the open-loop or closed-loop control unit that are considered appropriate by persons skilled in the art. Advantageously, particularly reliable sensing of the at least one insert-tool-specific characteristic can be ensured.

It is also proposed that at least the sensing unit be overmolded by a housing of the holding device, in particular the aforementioned housing. It is conceivable for the electronic device to be at least substantially completely overmolded. Alternatively, it is also conceivable for at least the energy storage unit to be interchangeably arranged on the housing, in particular connected to the sensing unit. In particular, the electronic device, in particular at least the sensing unit and/or the energy storage unit, are/is overmolded by the housing by a multi-component injection molding process or a coextrusion process, particularly preferably completely. Preferably, the housing has at least one recess so that at least one charging cable can be connected to the charging terminal for the purpose of charging the energy storage unit. Advantageously, a particularly robust electronic module, in particular electronic device, can be provided. Advantageously, the electronic device, in particular the sensing unit, the energy storage unit and/or the open-loop or closed-loop control unit can be protected particularly efficiently against splash water and/or dust. It can be ensured, advantageously, that the electronic device is arranged in a fixed manner in the housing, in particular even with static and/or dynamic loads acting on the electronic module.

Additionally proposed is an insert tool system, in particular the aforementioned or an alternative insert tool system, comprising at least one electronic module according to the disclosure, comprising at least one insert tool, in particular the aforementioned insert tool, and/or comprising at least one external device, in particular the aforementioned external device, data being transmissible between the electronic module and the external device via a communication unit, in particular the aforementioned communication unit of the electronic device. Advantageously, a particularly flexible and/or efficient processing, in particular evaluation and/or storage, of the at least one insert-tool-specific characteristic sensed by means of the sensing unit can be rendered possible.

It is furthermore proposed that the electronic device comprise at least one open-loop or closed-loop control unit and/or that the insert tool system comprise the external device comprising an open-loop or closed-loop control unit, in particular the aforementioned open-loop or closed-loop control unit, the open-loop or closed-loop control unit of the electronic device and/or of the external device being configured to ascertain a wear condition and/or a fall event of the insert tool in dependence on the at least one insert-tool-specific characteristic sensed by means of the sensing unit when arranged on the insert tool. Advantageously, a particularly flexible and/or efficient processing, in particular evaluation and/or storage, of the at least one insert-tool-specific characteristic sensed by means of the sensing unit can be rendered possible. Advantageously, at least an ascertainment of the wear condition and/or of a fall event of the insert tool can be evaluated in a spatially flexible manner.

It is additionally proposed that the external device be realized as a hand-held power tool on which the insert tool can be arranged, at least one operating parameter of the hand-held power tool being automatically settable in dependence on the at least one insert-tool-specific characteristic, an ascertained wear condition and/or a fall event of the insert tool. Additionally or alternatively, it is also conceivable for at least one operating parameter of the hand-held power tool to be automatically settable in dependence on an ascertained identification of the insert tool, preferably on the basis of sensed data relating to the at least one insert-tool-specific characteristic. For example, it is conceivable that in dependence on an evaluation of data of the at least one insert-tool-specific characteristic, in particular in dependence on an ascertained identification, an ascertained wear condition and/or an ascertained fall event, the hand-held power tool can be switched off automatically, at least a maximum torque and/or a maximum operating power of the hand-held power tool can be limited, or another adaptation of operating parameters of the hand-held power tool, considered appropriate by persons skilled in the art, can be performed automatically. Advantageously, a particularly safe, efficient and/or long-lasting use of an insert tool can be supported. Advantageously, the longevity of an insert tool can be increased in a particularly convenient manner.

Also proposed is a method for operating the electronic module according to the disclosure. In at least one method step, preferably at least one insert-tool-specific characteristic is sensed by means of the sensing unit, in particular at least when the electronic device has been arranged on the insert tool. It is conceivable for a multiplicity of different insert-tool-specific characteristics to be sensed in the method step by means of the sensing unit. It is conceivable for data sensed by means of the sensing unit relating to the at least one insert-tool-specific characteristic, or relating to the multiplicity of insert-tool-specific characteristics, to be stored on the memory unit in the method step. It is also conceivable for the data sensed by means of the sensing unit relating to the at least one insert-tool-specific characteristic, or relating to the multiplicity of insert-tool-specific characteristics, to be filtered before being stored on the memory unit. Alternatively, it is also conceivable for the data sensed by means of the sensing unit relating to the at least one insert-tool-specific characteristic, or relating to the multiplicity of insert-tool-specific characteristics, to be filtered and/or stored on the external device following transmission to the external device. In at least one further method step, data sensed by means of the sensing unit relating to the at least one insert-tool-specific characteristic, or relating to the multiplicity of insert-tool-specific characteristics, are preferably processed and/or evaluated, preferably by means of the open-loop or closed-loop control unit of the electronic device. Preferably, in the further method step, in dependence on the data sensed by means of the sensing unit relating to the at least one insert-tool-specific characteristic, or relating to the multiplicity of insert-tool-specific characteristics, at least one wear condition of the insert tool and/or a fall event of the insert tool is ascertained and/or the insert tool is identified. In at least one additional method step, in particular data sensed by means of the sensing unit relating to the at least one insert-tool-specific characteristic, or relating to the multiplicity of insert-tool-specific characteristics, are transmitted to the external device. It is additionally or alternatively conceivable for items of information relating an ascertained wear condition, a fall event of the insert tool and/or to an identification of the insert tool to be transmitted to the external device in the additional method step. It is also conceivable for items of information concerning the sensed data relating the at least one insert-tool-specific characteristic, or relating the multiplicity of insert-tool-specific characteristics, and/or concerning evaluations of the data, in particular relating to an ascertained wear condition, an ascertained fall event and/or on an identification of the insert tool to be output in the additional method step, in particular by means of the output unit of the external device and/or of the electronic device. Also alternatively conceivable is another sequence of the method steps that is considered appropriate by persons skilled in the art. In particular, it is conceivable for the processing, in particular evaluation, of data sensed by means of the sensing unit relating to the at least one insert-tool-specific characteristic, or relating to the multiplicity of insert-tool-specific characteristics, to be effected by means of the open-loop or closed-loop control unit of the external device. Advantageously, a condition of an insert tool can be monitored in a particularly precise manner. Advantageously, a processing, in particular evaluation, of data sensed by means of the sensing unit relating to the at least one insert-tool-specific characteristic, or relating to the multiplicity of insert-tool-specific characteristics, can be effected in a manner that is particularly flexible in respect of time and/or space.

The electronic module according to the disclosure, the insert tool system according to the disclosure and/or the method according to the disclosure are not intended in this case to be limited to the application and embodiment described above. In particular, the electronic module according to the disclosure, the insert tool system according to the disclosure and/or the method according to the disclosure may have a number of individual elements, components and units, as well as method steps, that differ in number from a number stated herein, in order to fulfill an operating principle described herein. Moreover, in respect the of the value ranges specified in this disclosure, values lying within the stated limits are also to be deemed as disclosed and applicable in any manner.

BRIEF DESCRIPTION OF THE DRAWINGS

Further advantages are disclosed by the following description of the drawing. The drawing shows five exemplary embodiments of the disclosure. The drawing, the description and the disclosure contain numerous features in combination. Persons skilled in the art will also expediently consider the features individually and combine them to create appropriate further combinations.

There are shown.

DETAILED DESCRIPTION

Figure 1:
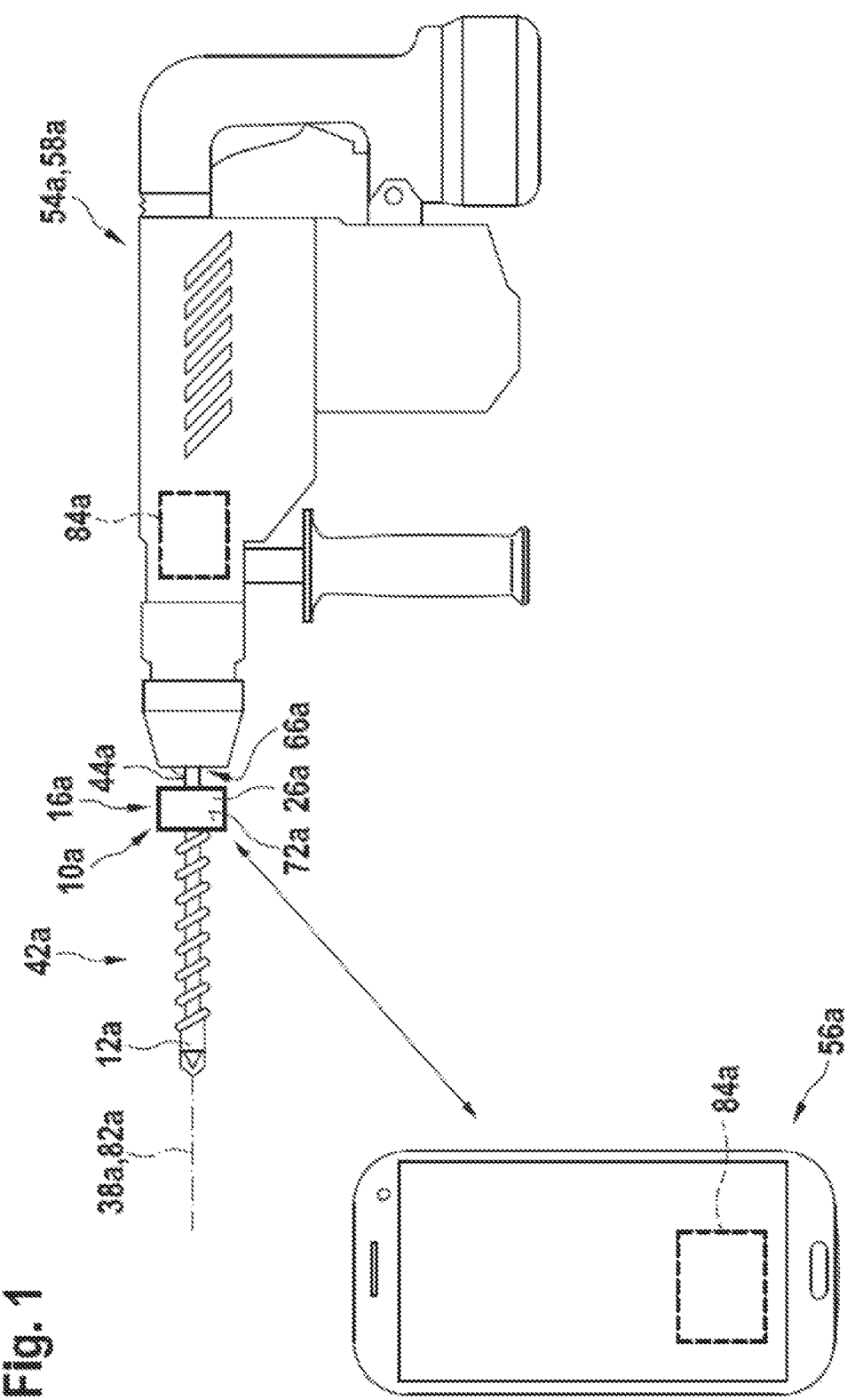
FIG. 1 a schematic representation of an insert tool system according to the disclosure with an electronic module according to the disclosure, FIG. 2 an exploded representation of the electronic module according to the disclosure, FIG. 3 a cross-section of the electronic module according to the disclosure, FIG. 4 a schematic sequence of a method according to the disclosure for operating the electronic module according to the disclosure, FIG. 5 an exploded representation of an electronic module according to the disclosure in a first alternative embodiment, FIG. 6 a schematic representation of an electronic module according to the disclosure in a second alternative embodiment, FIG. 7 an electronic module according to the disclosure in a third alternative embodiment, on an insert tool, and FIG. 8 a schematic representation of an electronic module according to the disclosure in a fourth alternative embodiment.

FIG. 1 shows an insert tool system 42*a* comprising at least one insert tool 12*a* and comprising at least one electronic module 10*a* for the insert tool 12*a*. The insert tool 12*a* is realized as a drill bit. Alternatively, it is also conceivable for the insert tool 12*a* to be realized as a chisel or another insert tool 12*a* that is considered appropriate by persons skilled in the art. The insert tool 12*a* has no special design, in particular has no special preparation/modification, for connection to the holding device 16*a*. The insert tool 12*a* is a commercially available insert tool 12*a*. The insert tool system 42*a* comprises at least one external device 54*a* realized as a hand-held power tool 58*a* (see FIG. 1). Alternatively, it is conceivable for the external device 54*a* to be realized as a laptop, a cloud server, a smartphone, a computer or the like. Alternatively or additionally, it is conceivable for the insert tool system 42*a* to comprise at least one further external device 56*a*. The further external device 56*a* is realized as a smartphone. Alternatively, it is conceivable for the further external device 56*a* to be realized as a laptop, a cloud server, a hand-held power tool, a computer or the like. The hand-held power tool 58*a* is realized as a power drill. Alternatively, it is conceivable for the hand-held power tool 58*a* to be realized as a hammer drill, a percussion hammer, a chipping hammer or the like. The insert tool 12*a* is designed for the hand-held power tool 58*a*. The hand-held power tool 58*a* comprises at least one insert-tool receiver 66*a*, in which or to which the insert tool 12*a* is attachable. It is conceivable that the insert tool 12*a* is drivable by the hand-held power tool 58*a*, in particular to rotate about a longitudinal axis 38*a* of the insert tool 12*a*. The hand-held power tool 58*a* is configured to drive the insert tool 12*a* to a rotational motion, in particular about the longitudinal axis 38*a* of the insert tool 12*a*. Additionally or alternatively, it is conceivable for the hand-held power tool 58*a* to comprise an impact mechanism for driving the insert tool 12*a* in an impact mode. An impact on the insert tool 12*a*, generated by the impact mechanism, is preferably effected along the longitudinal axis 38*a* of the insert tool 12*a*. The insert tool 12*a* has a circular cross-section. It is also conceivable, however, for the insert tool 12*a* to have a polygonal cross-section.

Figure 2:
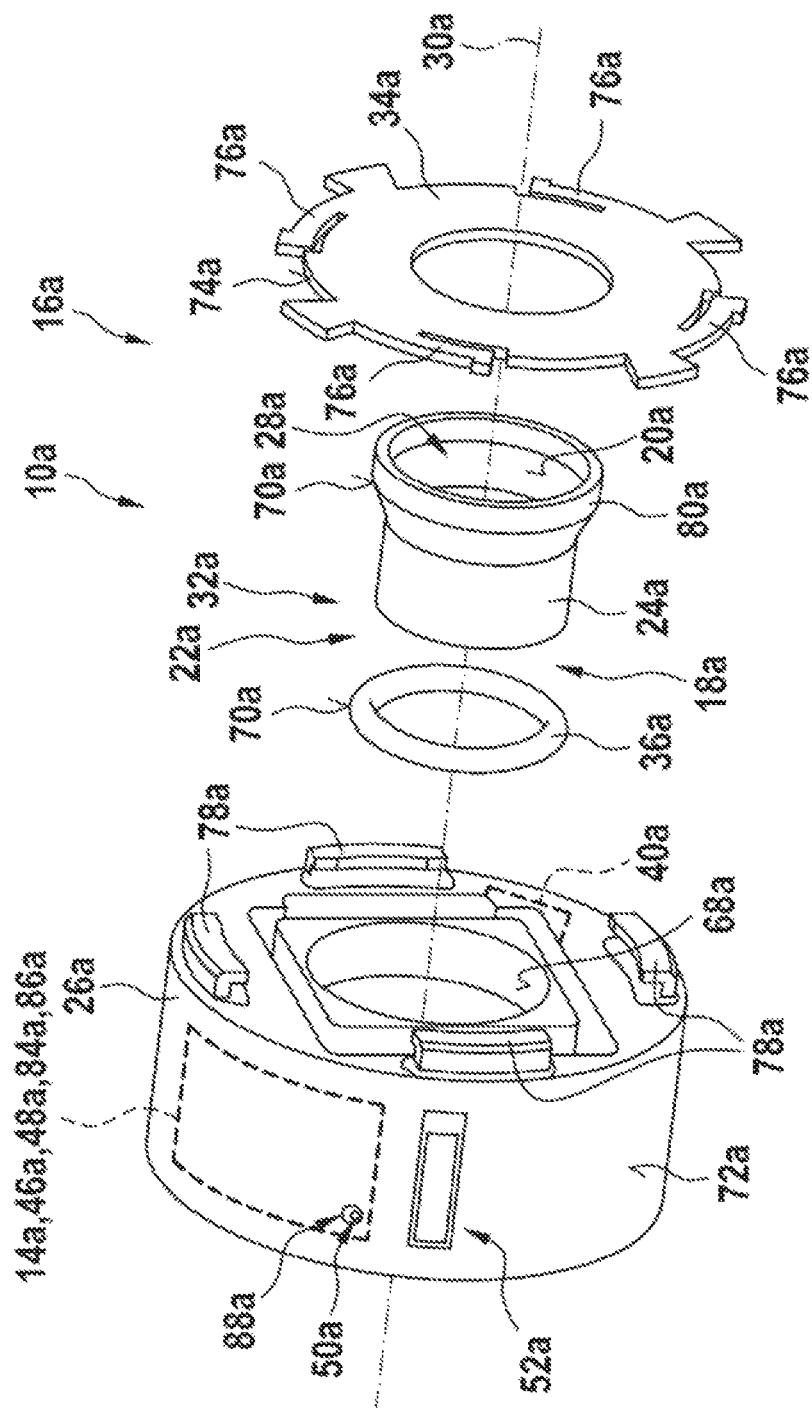

FIG. 2 shows an exploded representation of the electronic module 10*a*. The electronic module 10*a* comprises at least one electronic device 14*a* for processing and/or sensing insert-tool-specific characteristics. The electronic module 10*a* comprises at least one holding device 16*a* for releasably holding the electronic device 14*a* on the insert tool 12*a*. The holding device 16*a* comprises at least one insert-tool interface 18*a*. The insert-tool interface 18*a* has at least one contact surface 20*a* that, when the holding device 16*a* has been arranged on the insert tool 12*a*, is in contact, in particular in direct contact, with the insert tool 12*a*. The electronic module 10*a* comprises at least one damping unit 22*a* for damping vibrations acting on the electronic device 14*a*. The insert tool 12*a*, at least when the electronic module 10*a* has been arranged on the insert tool 12*a*, is at least substantially completely enclosed by the damping unit 22*a* and the holding device 16*a*, at least as viewed along a circumferential direction of the insert tool 12. The circumferential direction of the insert tool 12*a* extends in a plane perpendicular to the longitudinal axis 38, in particular the axis of rotation, of the insert tool 12*a*. The longitudinal axis 38*a*, in particular the axis of rotation, preferably corresponds to an axis of main extent 82*a* of the insert tool 12*a*.

The damping unit 22*a* at least partially constitutes the insert-tool interface 18*a*. The damping unit 22*a* is designed to damp vibrations acting from the insert tool 12*a* onto a housing 26*a* of the holding device 16*a*, in which the electronic device 14*a* is arranged. The damping unit 22*a* is designed to damp transmission of accelerations, occurring at the insert tool 12*a*, to the housing 26*a*, in particular the electronic device 14*a*, preferably by at least 50%, more preferably by at least 75%, particularly preferably by at least 90% and most particularly preferably by at least 99%. The damping unit 22*a* is realized in such a manner that damping of vibrations acting on the electronic device 14*a* is effected with, at the same time, insert-tool-specific characteristics being able to be sensed by means of the electronic device 14*a*. The damping unit 22*a* is designed to counteract transmission of heat from the insert tool 12*a* to the housing 26*a*, in particular to the electronic device 14*a*. The damping unit 22*a* is designed to enable a relative movement, in particular at least an axial relative movement, of the electronic device 14*a* with respect to the insert tool 12*a* when the holding device 16*a* has been arranged at the insert tool 12*a*. The damping unit 22*a* is designed to enable a relative movement, in particular at least an axial relative movement, of the housing 26*a* of the holding device 16*a* with respect to the insert tool 12*a* when the holding device 16*a* has been arranged at the insert tool 12*a*. The damping unit 22*a* is designed to enable a relative movement, in particular at least an axial relative movement, of the housing 26*a*, in particular of the electronic device 14*a*, with respect to the insert tool 12*a* when arranged on the insert tool 12*a*, such that an external surface 44*a* of the insert tool 12*a* enclosed by the housing 26*a* varies. The contact surface 20*a* of the insert-tool interface 18*a*, which is in direct contact with the insert tool 12*a* when the holding device 16*a* has been arranged on the insert tool 12*a*, is at least partially constituted by the damping unit 22*a*. The contact surface 20*a* of the insert-tool interface 18*a*, which is in direct contact with the insert tool 12*a* when the holding device 16*a* has been arranged on the insert tool 12*a*, is at least substantially completely constituted by the damping unit 22*a*. When the electronic module 10*a* has been arranged at the insert tool 12*a*, the damping unit 22*a* is in direct contact with the insert tool 12*a*, in particular with an external surface 44*a* of the insert tool 12*a*. The contact surface 20*a* bears against the external surface 44*a* of the insert tool 12*a* when the holding device 16*a* has been arranged on the insert tool 12*a*. The damping unit 22*a* comprises at least one damping element 24*a*. The damping element 24*a* is made of an elastomer, in particular rubber. The damping element 24*a* is realized as a shrink-on sleeve. It is also conceivable that at least the one damping element 24*a* to be realized as an O-ring, as an O-ring segment, as a hollow cylinder, as a hollow cylinder part, in particular a hollow cylinder half or the like. Alternatively, it is also conceivable that the damping element 24*a* to be realized as a spring, textile or the like. The damping element 24*a* at least partially constitutes the contact surface 20*a* of the insert-tool interface 18*a*. The damping element 24*a* is releasably connected to the holding device 16*a*, in particular to the housing 26*a* of the holding device 16*a*. The damping element 24*a* bears, without any special fastening, against the housing 26*a* of the holding device 16*a*. The damping element 24*a* is non-positively or positively connected to the housing 26*a*. By means of the holding device 16*a*, the electronic device 14*a* can be attached to the insert tool 12*a* so as to be releasable in a non-destructive manner. The holding device 16*a*, which is designed to releasably hold the electronic device 14*a* on the insert tool 12*a*, is configured for repeated detaching/attaching of the electronic device 14*a* and/or of the housing 26*a* from/to the insert tool 12*a* and/or from/to another insert tool.

The damping unit 22*a*, preferably at least the one damping element 24*a*, be clamped, gripped and/or fixed between the housing 26*a* and the insert tool 12*a* by means of the housing 26*a* when the holding device 16*a* has been arranged on the insert tool 12*a*. The holding device 16*a* is designed to releasably attach the electronic device 14*a* to the external surface 44*a* of the insert tool 12*a*. The holding device 16*a* comprises at least one holding unit 32*a*, which is designed to attach and/or detach the insert tool 12*a* to/from the insert-tool interface 18*a* in a receiving region 28*a* for the insert tool 12*a* that is at least partially delimited by the damping unit 22*a*.

The damping unit 22*a* comprises at least one damping element 24*a*, which at least is realized in the manner of a circular ring segment and constitutes the contact surface 20*a* of the insert-tool interface 18*a*. Alternatively, it is conceivable for the damping element 24*a* to be realized in the manner of a cube, having the shape of a plate or the like. A contour of the contact surface 20*a* corresponds to a contour of the external surface 44*a* of the insert tool 12*a* against which the holding device 16*a*, in particular the contact surface 20*a* of the at least one damping element 24*a*, bears when the holding device 16*a* has been arranged on the insert tool 12*a*. The contact surface 20*a* at least partially constituted by the at least one damping element 24*a* is curved. A curvature of the contact surface 20*a* corresponds to a curvature of the external surface 44*a* of the insert tool 12*a*. It is also conceivable for the contact surface 20*a* constituted by the at least one damping element 24*a* to be flat, in particular without curvature, in particular in the case of an insert tool 12a that has a polygonal cross-section in a region on which the electronic device 14a can be arranged. The damping element 24a has a cross-section corresponding to a whole circular ring. It is also conceivable for the damping element 24a to be realized in such a manner that a cross-section of the damping element 24a corresponds to a circular ring segment.

The holding device 16a comprises at least one housing 26a in which the electronic device 14a is arranged. The damping unit 22a, in particular at least the damping element 24a of the damping unit 22a constituting the contact surface 20a of the insert-tool interface 18, is arranged on a side of the housing 26a that faces toward the insert tool 12a when the holding device 16a has been arranged on the insert tool 12a. The housing 26a has a cross-section that, at least when the holding device 16a has been arranged on the insert tool 12a, corresponds to a circular ring. The housing 26a has at least one inner housing external surface 68a that, 12a when the holding device 16a has been arranged on the insert tool 12a, is realized on the side of the housing 26a that faces the insert tool. The damping unit 22a, in particular at least the damping element 24a and/or a further damping element 36a, bears/bear against the inner housing external surface 68a at least in an operating state. The damping element 24a and/or the further damping element 36a have/has at least one housing contact surface 70a, against which the housing 26a, in particular the inner housing external surface 68a, bears at least in an operating state. A contour of the housing contact surface 70a corresponds to a contour of the inner housing external surface 68a, against which the housing contact surface 70a abuts at least in an operating state. It is conceivable for the housing contact surface 70a and/or the inner housing external surface 68a to have, at least partially, a round and/or a polygonal contour. The housing 26a comprises an outer housing external surface 72a arranged on a side of the housing 26a that faces away from the side of the housing 26a on which the inner housing external surface 68a is arranged. A contour of the outer housing external surface 72a is round. It is also conceivable for a contour of the outer housing external surface 72a to be at least partially round, oval and/or polygonal. It is conceivable for the outer housing external surface 72a has a rectangular, in particular square, contour.

The insert-tool interface 18a, in particular the damping unit 22a, at least partially surrounds a receiving region 28a for the insert tool 12a. The holding device 16a and the damping unit 22a, at least in an operating state, have a common center of mass and/or a central axis 30a of the receiving region 28a intersects a center of mass of the holding device 16a and of the damping unit 22a, at least as viewed in a plane perpendicular to the central axis 30a. The holding device 16a and the damping unit 22a, in an operating state, have at least one common center of mass and/or the central axis 30a of the receiving region 28a intersects a center of mass of the holding device 16a and a center of mass of the damping unit 22a, at least as viewed in a plane perpendicular to the central axis 30a, in order to achieve unbalance compensation in the case of an insert tool 12a that is driven in a rotating and/or percussive manner in an operating state. The longitudinal axis 38a of the insert tool 12a is at least substantially parallel to the central axis 30a of the receiving region 28a, at least when the holding device 16a has been arranged on the insert tool 12a. The receiving region 28a is completely surrounded by the damping unit 22a, at least as viewed along a circumferential direction of the receiving region 28a. The circumferential direction of the receiving region 28a extends, in particular, in a plane perpendicular to the central axis 30a of the receiving region 28a. It is also conceivable for the receiving region 28a to be partially surrounded by the damping unit 22a, in particular at least as viewed along the circumferential direction of the receiving region 28a. The receiving region 28a, at least viewed along the circumferential direction of the receiving region 28a, is completely delimited by the damping unit 22a. The damping unit 22a and/or the holding device 16a are/is arranged symmetrically about the central axis 30a of the receiving region 28a, at least in respect of a weight distribution and/or a spatial extent.

The holding device 16a comprises at least one holding unit 32a, which is designed to attach and/or detach the insert tool 12a to/from the insert-tool interface 18a in the receiving region 28a for the insert tool 12a that is at least partially delimited by the damping unit 22a, without use of tools. The holding unit 32a is realized as a bayonet lock. The insert tool 12a can be manually attached/detached to/from the insert-tool interface 18a in the receiving region 28a at least partially delimited by the damping unit 22a, without use of tools. The holding unit 32a is configured to be actuated manually for the purpose of detaching and/or attaching, in particular without use of any additional tool. The insert tool 12a can manually attached/detached to/from the insert-tool interface 18a in the receiving region 28a for the insert tool 12a by means of the holding unit 32a. By means of the holding unit 32a and/or the damping unit, insert tools 12a of different sizes, in particular different diameters, can be attached to the insert-tool interface 18a in the receiving region 28a. A maximum diameter of the receiving region 28a can be varied at least via a material thickness of the at least one damping element 24a that, in particular, at least partially constitutes the contact surface 20a. Additionally or alternatively, it is conceivable for the holding unit 32a to be designed to be adjustable for the purpose of attaching insert tools 12a of different sizes, in particular of different diameters. For example, it is conceivable for the holding unit 32a to be designed to be adjustable in such a manner that a maximum diameter of the receiving region 28a for the insert tool 12a can be varied, in particular at least in an embodiment of the holding unit 32a realized as a ratchet lock, screw lock and/or clip lock. A holding force of the insert tool 12a at the insert-tool interface 18a in the receiving region 28a is adjustable via the holding unit 32a and/or the damping unit 22a. The holding force of the insert tool 12a at the insert-tool interface 18a in the receiving region 28a is adjustable, for example, at least by a choice of material, in particular elasticity and/or hardness, a material thickness or the like, of the damping element 24a and/or of the further damping element 36a. At least a part of the bayonet lock is arranged on the housing 26a. The bayonet lock is realized integrally with the housing 26a, at least partially. The bayonet lock is designed to clamp the housing 26a, at least axially, to the damping unit 22a. When the bayonet lock has been closed, in particular also when the holding device 16a has been released from the insert tool 12a, the damping unit 22a is arranged in a captive manner on and/or in the holding device. The bayonet lock comprises at least one metallic locking ring 34a.

Alternatively, it is also conceivable for the locking ring 34a to be made of a plastic or the like. The locking ring 34a has four positive locking elements 76a at least on/on an outer ring surface 74a. Also alternatively conceivable is a number of positive locking elements 76a other than four. The outer ring surface 74a is at least substantially parallel to the inner housing external surface 68a, to the outer housing external surface 72a and/or to the central axis 30a of the receiving region 28a, in particular at least in an operating state. The positive locking elements 76a are realized as projections. The bayonet lock comprises four further positive locking elements 78a. Alternatively, it is also conceivable for the bayonet lock to comprise a number of further positive locking elements 78a other than four. The four positive locking elements 78a are arranged on the housing 26a, in particular realized integrally with the housing 26a. The four further positive locking elements 78a are realized as projection receivers. It is also conceivable for the four positive locking elements 76a to be realized as projection receivers, and the four further positive locking elements 78a to be realized as projections. The positive locking elements 76a of the locking ring 34a are designed to act in combination with the four further positive locking elements 78a for the purpose of attaching the locking ring 34a to the housing 26a. The further positive locking elements 78a, realized as projection receivers, are designed to receive the positive locking elements 76a, realized as projections, for the purpose of attaching the locking ring 34a to the housing 26a. The bayonet lock is closable in the case of a corresponding axial distance between the housing 26a and the locking ring 34a, by a rotation of the locking ring 34a relative to the housing 26a, in particular by a rotation about the longitudinal axis 38a. The housing 26a is at least partially made of a plastic and/or at least partially made of a metal. Particularly preferably, the housing 26a is made at least substantially entirely of a plastic.

The damping element 24a realized as a shrink-on sleeve is designed to be applied to the insert tool 12a, in particular to the external surface 44a of the insert tool 12a. The damping element 24a realized as a shrink-on sleeve is designed to be applied to the insert tool 12a, in particular to the external surface 44a of the insert tool 12a, by means of a hot air flow. The damping element 24a realized as a shrink-on sleeve comprises, for example, an adhesive layer that in particular is intended to be fused-on when the damping element 24a is being attached to the insert tool 12a. Preferably, the adhesive layer can be fused-on by means of a hot air flow and/or by a previously generated heating of the insert tool 12a. There is an elevation 80a, in particular a rim, realized on an outer side of the damping element 24a realized as a shrink-on sleeve, on which the housing contact surface 70a is arranged. The elevation 80a extends completely along a circumferential direction of the damping element 24a. The circumferential direction of the damping element 24a realized as a shrink-on sleeve extends in particular in a plane perpendicular to the central axis 30 of the receiving region 28a. It is also alternatively conceivable for the elevation 80a to extend partially, for example in sections, along a circumferential direction of the damping element 24a. The elevation 80a is designed to at least partially delimit and/or damp at least an axial movement of the housing 26a relative to the damping element 24a realized as a shrink-on sleeve and/or to the insert tool 12a, at least in an operating state.

The damping unit 22a comprises at least one further damping element 36a, realized as an O-ring. The further damping element 36a, realized as an O-ring, encloses the damping element 24a realized as a shrink-on sleeve, at least as viewed along the circumferential direction of the damping element 24a, at least in an operating state. The damping element 24a realized as a shrink-on sleeve and/or the further damping element 36a realized as an O-ring are/is arranged, at least in an operating state, in particular when the bayonet lock has been closed, on a side of the housing 26a that faces toward the receiving region 28a, particularly preferably arranged in a manner such that it cannot be lost. The further damping element 36a, realized as an O-ring, is arranged between the damping element 24a, realized as a shrink-on sleeve, and the housing 26a, at least in an operating state. A maximum diameter of a region constituted by the inner housing external surface 68a is smaller, at least at one location, than a maximum outer diameter of the further damping element 36a realized as an O-ring. The further damping element 36a realized as an O-ring is designed to at least partially delimit and/or damp at least an axial movement of the housing 26a relative to the further damping element 36a realized as an O-ring and/or to the insert tool 12a, at least in an operating state. For the purpose of damping and/or delimiting an axial movement of the housing 26a relative to the insert tool 12a in at least one operating state, the further damping element 36a, realized as an O-ring, is designed to act in combination with the damping element 24a realized as a shrink-on sleeve, in particular the elevation 80a, and/or a housing external surface of the housing 26a.

The damping unit 22a realizes the insert-tool interface 18a in such a manner that the damping unit 22a, when the insert tool 12a has been arranged at the insert-tool interface 18a, is designed at least to damp vibrations, acting on the electronic device 14a, that can be caused by impacts or shocks of the insert tool 12a acting along a longitudinal axis 38a, in particular the axis of rotation, of the insert tool 12a. The electronic device 14a and/or the housing 26a can be attached to the insert tool 12a via the damping unit 22a and the holding unit 32a in such a manner that, in particular upon the occurrence of impacts and/or shocks to the insert tool 12a, the holding device 16a, in particular the housing 26a, and/or the electronic device 14a can be moved relative to the insert tool 12a at least axially, in particular parallel to the longitudinal axis 38a and/or the central axis 30a. The axial movability of the holding device 16a, in particular of the housing 26a, and/or of the electronic device 14a relative to the insert tool 12a when the holding device 16a has been arranged on the insert tool 12a is adjustable via the holding force that can be generated by the damping unit 22a and/or the holding unit 32a.

The electronic device 14a has at least one sensing unit 48a designed to actively sense at least one tool-specific characteristic, in particular at least for the purpose of ascertaining a wear condition and/or a fall event of the insert tool 12a. The sensing unit 48a comprises a multiplicity of different sensors, in particular to sense a multiplicity of different insert-tool-specific characteristics. It is also conceivable, however, for the sensing unit 48a to comprise only one sensor to sense an insert-tool-specific characteristic of the insert tool 12a. The sensing unit 48a comprises, for example, at least one of a temperature sensor, a motion sensor, an optical sensor, an acoustic sensor, a locating sensor, a moisture sensor, and/or the like. The at least one insert-tool-specific characteristic is realized, for example, as a temperature characteristic, a motion characteristic, an optical characteristic, an acoustic characteristic, a position characteristic, a moisture characteristic, or the like. The electronic device 14a, the external device 54a and/or the further external device 56a comprise/comprises an open-loop or closed-loop control unit 84a for processing data sensed by means of the sensing unit 48a relating to the at least one insert-tool-specific characteristic. The open-loop or closed-loop control unit 84a has at least one, in particular wireless and/or wireless, communication interface that preferably can be used at least for updating the operating program. It is conceivable for the open-loop or closed-loop control unit/s 84*a* to be at least partly based on artificial intelligence, and in particular configured for machine learning. For example, the open-loop or closed-loop control unit/s 84*a* process data sensed by means of the sensing unit 48*a*, at least partly by means of a self-learning algorithm. Can be transmitted between the electronic device 14*a* and the external device 54*a* and/or the further external device 56*a*, in particular via a communication unit 86*a* of the electronic device 14*a*. It is conceivable for the communication unit 86*a* to be configured for wireless and/or wired data exchange. The communication unit 86*a* comprises, for example, a WLAN module, a Bluetooth low-energy module, a Zigbee module or another communication module considered appropriate by persons skilled in the art. Preferably, the components and/or units of the electronic device 14*a*, in particular at least the sensing unit 48*a*, the communication unit 86*a* and/or the open-loop or closed-loop control unit 84*a*, are arranged at least partially, preferably largely, on/on a common printed circuit board. The at least one insert-tool-specific characteristic is designed to be evaluated for the purpose of ascertaining a wear condition and/or a fall event of the insert tool 12*a*, by means of the open-loop or closed-loop control unit 84*a* of the electronic device 14*a*, of the external device 54*a* and/or of the further external device 56*a*. Preferably, a wear condition and/or a fall event of the electronic module 10*a*, in particular of the electronic device 14*a*, can be ascertained in dependence on the at least one insert-tool-specific characteristic, in particular by means of at least one of the open-loop or closed-loop control units 84*a*. The open-loop or closed-loop control unit/s 84*a* are/is configured in particular to ascertain from data, ascertained by means of the sensing unit 48*a*, relating to the at least one insert-tool-specific characteristic, at least one usage characteristic of the insert tool 12*a*, for example a duration of use, a type of use, a number of uses, in particular a number of drilled holes or the like, an intensity of use or the like. It is also conceivable for the open-loop or closed-loop control unit/s 84*a* to be configured to calculate and accumulate on the basis of data sensed by means of the sensing unit 48*a* relating to the at least one insert-tool-specific characteristic, in particular by means of algorithms, for example a drilling time, a number of drilled holes or the like. For example, calculation/accumulation of a usage characteristic, in particular of the drilling time and of the number of drilled holes, is effected by the open-loop or closed-loop control unit/s 84*a* by means of a moving average, an envelope of sensed values of the at least one insert-tool-specific characteristic, in particular of the sensed acceleration values, and/or use of selective amplitude values, wherein amplitudes can be converted in particular by means of an RMS value. Ascertainment of a fall event, in particular a free fall event, of the insert tool 12*a* is preferably based on an algorithm that detects a change in an acceleration of the insert tool 12*a* with respect to the acceleration due to gravity, wherein sensed acceleration values can preferably be converted by means of an RMS value, such that, in particular, a moving average can be formed and can be compared with a range of values, in particular a threshold value, that is preferably stored on a database. The open-loop or closed-loop control unit/s 84*a* of the electronic device 14*a*, of the external device 54*a* and/or of the further external device 56*a* are/is configured to ascertain, in dependence on data sensed by means of the sensing unit 48*a* relating to the at least one insert-tool-specific characteristic, in particular in dependence on the at least one usage characteristic, a wear condition of the insert tool 12*a*, a fall event of the insert tool 12*a* or the like. It is also conceivable that, in dependence on data sensed by means of the sensing unit 48*a* relating to the at least one insert-tool-specific characteristic, in particular in dependence on the at least one usage characteristic, the wear condition and/or ascertained fall events, automatic ordering and/or delivery of spare parts or the like can be performed, for example by transmission of the sensed and/or evaluated data to an external device, for example realized as a cloud server, by means of the communication unit 86*a*. It is also conceivable that, in dependence on data sensed by means of the sensing unit 48*a* relating to the at least one insert-tool-specific characteristic, in particular in dependence on the at least one usage characteristic, a material of the workpiece on which work is performed by the insert tool 12*a* can be ascertained, preferably by means of at least one of the open-loop or closed-loop control unit/s 84*a*. Preferably, the sensing unit 48*a* is different from a transmitter module that is configured to emit and/or transmit insert-tool-specific data already stored in a memory of the transmitter module. In particular, the sensing unit 48*a* differs in design from an RFID tag configured to emit and/or transmit an already stored identifier of an insert tool 12*a*.

The electronic device 14*a* comprises at least one identification unit 46*a* for identifying the insert tool 12*a*. It is conceivable for the identification unit 46*a* of the electronic device 14*a* to be realized as an RFID tag. It is also conceivable for the identification unit 46*a* to be constituted by the sensing unit 48*a*, the sensing unit 48*a* being configured to actively sense an insert-tool-specific characteristic realized as an identification characteristic of the insert tool 12*a*. It is conceivable for the insert-tool-specific characteristic realized as an identification characteristic to be designed to be evaluated for the purpose of identifying the insert tool 12*a*, in particular by means of at least one of the open-loop or closed-loop control units 84*a*. It is conceivable for a digital data sheet to be assignable to the insert tool 12*a* by means of an identification. The digital data sheet comprises, for example, a product identifier, an insert-tool type, an insert-tool diameter, manufacturer information, a date of manufacture, an insert-tool material or the like. Preferably, information relating to an identification of the insert tool 12*a* on which the electronic device 14*a* is arranged can be stored on/retrieved from a memory unit (not represented in more detail) of the electronic device.

The sensing unit 48*a* comprises at least one temperature sensor, which is designed to sense at least one insert-tool-specific characteristic realized as a temperature characteristic of the insert tool 12*a*, when the electronic device 14*a* has been arranged on the insert tool 12*a*, in particular at least for the purpose of ascertaining a wear condition of the insert tool 12*a*. Preferably, the temperature characteristic is a temperature of the insert tool 12*a*. It is also conceivable for the temperature characteristic to be, for example, a rotational speed or the like from which a temperature of the insert tool 12*a* and/or of the electronic device 14*a* can be ascertained, preferably by means of at least one of the open-loop or closed-loop control units 84*a*. The temperature sensor is realized, for example, as a negative temperature coefficient thermistor, a positive temperature coefficient thermistor, an integrated semiconductor temperature sensor, a diode, a temperature sensor with oscillating quartz, a thermocouple or another temperature sensor considered appropriate by persons skilled in the art. For the purpose of sensing a temperature characteristic realized as a rotational speed or the like, the temperature sensor is preferably realized as a speed sensor or acceleration sensor considered appropriate by persons skilled in the art. In addition, it is conceivable for the temperature sensor to be configured to sense a temperature characteristic of the electronic device 14*a*. It is conceivable that a temperature characteristic, in particular a temperature, of the electronic device 14*a* can be ascertained in dependence on the insert-tool-specific characteristic realized as a temperature characteristic of the insert tool 12*a*, in particular by means of at least one of the open-loop or closed-loop control units 84*a*. In particular, a temperature gradient can be ascertained on the basis of sensed data relating to the insert-tool-specific characteristic realized as a temperature characteristic, by means of at least one of the open-loop or closed-loop control units 84*a*. For example, information relating to a use of the insert tool 12*a*, to the workpiece on which work is performed by means of the insert tool 12*a*, in particular a material of the workpiece on which work is performed, and/or a duration of a work operation with the insert tool 12*a*, in particular a drilling operation or the like, can be ascertained in dependence on the ascertained temperature gradient, in particular by means of at least one of the open-loop or closed-loop control units 84*a*.

The sensing unit 48*a* comprises at least one motion sensor (not represented in more detail), which is designed to sense at least one insert-tool-specific characteristic realized as a motion characteristic of the insert tool 12*a*, when the electronic device 14*a* has been arranged on the insert tool 12*a*, in particular at least for the purpose of ascertaining a wear condition and/or a fall event of the insert tool 12*a*. The motion characteristic may be, for example, an acceleration, a rotational speed, a vibration, a position/orientation or the like of the insert tool 12*a*. The motion sensor is realized, for example, as a MEMS sensor, a piezoelectric sensor, or another motion sensor considered appropriate by persons skilled in the art. For example, a motion sensor realized as an acceleration sensor is configured to sense, in particular at least when the electronic device 14*a* has been arranged on the insert tool 12*a*, preferably at a specific sampling rate, acceleration amplitudes occurring during use of the insert tool 12*a*, preferably in all three spatial directions. For example, at least in dependence on an acceleration characteristic realized as an acceleration, a fall event of the insert tool 12*a* can be ascertained, in particular by means of at least one of the open-loop or closed-loop control unit 84*a*. It is also conceivable that, on the basis of data ascertained by means of the motion sensor relating to the at least one motion characteristic, a number of drilling operations performed, an operating time of the insert tool 12*a* or the like can be ascertained, in particular a wear condition of the insert tool 12*a* being ascertainable in dependence thereon, particularly preferably by means of at least one of the open-loop or closed-loop control units 84*a*. Preferably, in dependence on the insert-tool-specific characteristic realized as an acceleration characteristic, an improper use of the insert tool 12*a*, for example occurring impacts or the like, can be ascertained, in particular by means of at least one of the open-loop or closed-loop control units 84*a*.

The sensing unit 48*a* comprises, for example, at least one optical sensor, which is designed to sense at least one insert-tool-specific characteristic realized as an optical characteristic of the insert tool 12*a* at least when the electronic device 14*a* has been arranged on the insert tool 12*a*. It is conceivable for the optical sensor to be designed to sense at least the insert-tool-specific characteristic, realized as an optical characteristic, of the insert tool 12*a*, at least when the electronic device 14*a* has been arranged on the insert tool 12*a*, at least for the purpose of identifying the insert tool 12*a* and/or for the purpose of ascertaining of a wear condition of the insert tool 12*a*. The optical characteristic is preferably an optical signal, for example visible light, infrared radiation, UV radiation or the like. It is conceivable for the optical sensor to be realized as a radar sensor, a LIDAR sensor, a SAR sensor, a laser sensor, as a camera sensor, or as another optical sensor considered appropriate by persons skilled in the art. It is conceivable that data sensed by means of the optical sensor, in particular at least relating to the insert-tool-specific characteristic realized as an optical characteristic, can be processed in an imaging process, preferably by means of at least one of the open-loop or closed-loop control units 84*a*. Preferably, the optical sensor is designed to sense an identification code arranged on the insert tool 12*a*, for example an alphanumeric code, a barcode, a QR code or the like. In particular, the insert tool 12*a* is identifiable, preferably by means of at least one of the open-loop or closed-loop control units 84*a*, in dependence on the identification code that is sensed by means of the optical sensor and arranged on the insert tool 12*a*. It is also conceivable that the insert tool 12*a* is identifiable, preferably by means of at least one of the open-loop or closed-loop control units 84*a*, on the basis of data sensed by means of the optical sensor relating to the at least one optical characteristic and processed, in particular, in an imaging process. It is conceivable that the data sensed by means of the optical sensor relating to the at least one optical characteristic can be compared, preferably by means of at least one of the open-loop or closed-loop control units 84*a*, with a database, preferably at least reference data relating to the optical characteristic, which in particular correspond to an insert tool 12*a* in new condition, being stored on the database. Preferably, a wear condition of the insert tool 12*a* can be ascertained on the basis of the comparison. Additionally or alternatively, it is conceivable for the sensing unit 48*a*, in particular the optical sensor, to be configured to automatically sense a arranged on the hand-held power tool 58*a*, in particular on or in the insert-tool receiver 66*a*. It is conceivable for a time-point of attachment of the insert tool 12*a* to the hand-held power tool 58*a* to be stored. It is also conceivable that an attachment duration of the insert tool 12*a* to the hand-held power tool 58*a* and/or a detaching of the insert tool 12*a* from the insert tool machine 58*a* can be sensed by means of the sensing unit 48*a*, preferably automatically, and in particular can be stored by the electronic device 14*a*, in particular on the memory unit of the electronic device 14*a*.

The sensing unit 48*a* comprises, for example, at least one acoustic sensor, which is designed to sense at least one insert-tool-specific characteristic realized as an acoustic characteristic of the insert tool 12*a*, when the electronic device 14*a* has been arranged on the insert tool 12*a*, in particular for the purpose of ascertaining a wear condition of the insert tool 12*a*. Preferably, the insert-tool-specific characteristic realized as an acoustic characteristic is an acoustic signal, in particular a frequency and/or a volume, generated by the insert tool 12*a* during operation. Preferably, the insert-tool-specific characteristic realized as an acoustic characteristic can be used to ascertain a wear condition of the insert tool 12*a*, preferably by means of at least one of the open-loop or closed-loop control units 84*a*. It is conceivable that the data sensed by means of the acoustic sensor relating to the at least one acoustic characteristic can be compared, by means of at least one of the open-loop or closed-loop control units 84*a*, with a database on which preferably at least reference data relating to the acoustic characteristic, which correspond to an insert tool 12*a* in new condition, are stored. Particularly preferably, a wear condition of the insert tool 12*a* can be ascertained on the basis of the comparison. The acoustic sensor is realized, for example, as a microphone, as an ultrasonic sensor or as another acoustic sensor considered appropriate by persons skilled in the art.

The sensing unit 48*a* comprises, for example, at least one locating sensor system, which is configured to sense, in particular to track in real time, in particular over an extensive area, an insert-tool-specific characteristic realized as a position characteristic of the insert tool 12*a*, when the electronic device 14*a* has been arranged on the insert tool 12*a*. The locating sensor system is in particular configured to sense, for example by means of GPS, Bluetooth low-energy, UWB, WLAN, Zigbee or the like, a position of the insert tool 12*a* when the electronic device 14*a* has been arranged on the insert tool 12*a*. In particular, the locating sensor system is configured to track the position characteristic, in particular the position, of the insert tool 12*a* over an extensive area and/or in real time. It is also conceivable that, when the electronic device 14*a* has been arranged on the insert tool 12*a*, a position of the insert tool can be sensed by means of fingerprinting, gateways or the like. For example, when the electronic device 14*a* has been arranged on the insert tool 1*a*, a position of the insert tool 12*a* may be monitored by means of the locating sensor system via a smartphone, in particular the further external device 56*a*, or the like. Preferably, the locating sensor system differs in design from an RFID tag. Alternatively or additionally, however, it is also conceivable that a position of the insert tool 12*a* can be sensed by means of an RFID tag or the like. It is conceivable that the data sensed by means of the locating sensor system relating to the position characteristic can be evaluated for the purpose of ascertaining a wear condition, preferably by means of at least one of the open-loop or closed-loop control units 84*a*. For example, the position characteristic can be used to ascertain improper storage, in particular excessively moist, cold or hot storage, of the insert tool 12*a* and/or of the electronic device 14*a*. The memory unit is configured to store at least partially, in particular automatically, data sensed by means of the sensing unit 48*a* relating to the at least one insert-tool-specific characteristic.

The memory unit is realized, for example, as an SSD, a RAM or the like. Preferably, the electronic device 14*a* is configured to sense the at least one insert-tool-specific characteristic continuously, or automatically at time intervals. Preferably, the time intervals at which the sensing unit 48*a* senses the at least one insert-tool-specific characteristic are adjustable, preferably via at least one of the open-loop or closed-loop control units 84*a*. It is conceivable that the time intervals are adjustable in a stepless or steplike manner. It is also conceivable that it is possible to switch between continuous sensing and sensing at time intervals. For example, the external device 54*a*, the further external device 56*a* and/or the electronic device 14*a* comprise/s at least one input unit. It is conceivable that settings of the electronic device 14*a*, in particular of the sensing unit 48*a* and/or of the open-loop or closed-loop control unit 84*a*, are adjustable by a user via the input unit. It is conceivable for the input unit to be arranged on the housing 26*a*. It is also conceivable that information relating to the insert tool 12*a*, on which the electronic device 14*a* is arranged, can be entered via the input unit, in particular at least for manual identification/assignment of the insert tool 12*a*. The input unit is realized, for example, as a keypad, as a setting wheel, as a touch screen or as another input unit considered appropriate by persons skilled in the art. It is also conceivable for the input unit of the electronic device 14*a* to comprise a wireless or wired communication interface via which information can be entered, for example via the further external device 56*a*.

It is also conceivable for the communication interface of the input unit to be constituted by the communication unit 86*a*. It is also conceivable for the sensing unit 48*a* to be configured to sense the at least one insert-tool-specific characteristic only when the insert tool 12*a* is in a drive state. For example, a drive state can be communicated via the communication unit 86*a* from the external device 54*a*, in particular the hand-held power tool 58*a*, to the electronic device 14*a*, in particular the open-loop or closed-loop control unit 84*a* and/or the sensing unit 48*a*. It is also conceivable that a drive state of the insert tool 12*a* can be sensed by the sensing unit 48*a*. Preferably, the memory unit is configured to store, continuously and automatically, data sensed by means of the sensing unit 48*a* relating to the at least one insert-tool-specific characteristic. It is conceivable for the memory unit to be realized as a ring memory, or to be designed to permanently store the data sensed by means of the sensing unit 48*a*. Preferably, data stored on the memory unit can be read out by at least one of the open-loop or closed-loop control units 84*a*.

The electronic device 14*a* is configured to filter before storage and/or transmission, when the electronic device 14*a* has been arranged on the insert tool 12*a*, data sensed by means of the sensing unit 48*a* relating to the at least one insert-tool-specific characteristic. Preferably, the open-loop or closed-loop control unit/s 84*a* is/are configured to filter the data sensed by means of the sensing unit 48*a* relating to the at least one insert-tool-specific characteristic with an anti-alias filter or the like. It is conceivable that the sensing unit 48*a* can be set in such a manner that the sensing unit 48*a* senses only data relating to the at least one insert-tool-specific characteristic if these data are within a certain value range. It is also conceivable for the memory unit to be configured to store data sensed by means of the sensing unit 48*a* if these are within the set value range. It is conceivable for a value range for the at least one insert-tool-specific characteristic to be stored in a database, which is preferably stored on the memory unit of the electronic device 14*a*, of the external device 54*a* and/or of the further external device 56*a*, in dependence on which in particular the sensing unit 48*a* senses data relating to the at least one insert-tool-specific characteristic and/or in dependence on which the memory unit stores data relating to the at least one insert-tool-specific characteristic sensed by means of the sensing unit 48*a*. Preferably, the range of values is adjustable in such a manner that relevant values relating to the at least one insert-tool-specific characteristics can be sensed and/or stored for the purpose of ascertaining a wear condition, a fall event and/or an identification of the insert tool 12*a*.

The electronic device 14*a* comprises at least one output unit 52*a*. Alternatively, it is also conceivable for the electronic device 14*a* to be realized without an output unit 52. The output unit 52*a* is at least designed to output information in dependence on the at least one insert-tool-specific characteristic sensed by means of the sensing unit 48*a*, in particular in dependence on the at least one usage characteristic. Preferably, the output unit 52*a* is arranged on the housing 26*a*. Alternatively or additionally, it is also conceivable for an output unit 52*a* to be arranged on the external device 54*a* and/or on the further external device 56*a*. The output unit may be realized, for example, as a screen, as a loudspeaker, as an illumination unit, in particular LEDs or the like, as a laser module or the like. The information preferably comprises at least one instruction for action and/or an instruction for use. The information may also comprise, for example, the at least one usage characteristic, a state of wear of the insert tool 12*a*, operating data of the insert tool 12a, information relating to fall events of the insert tool 12a, information relating to damage, work support information or the like. For example, information on possible uses of the insert tool 12a, operating instructions, warranty conditions, instructions for action or the like can be output to a user in dependence on an identification of the insert tool 12a by means of the identification unit 46a, in particular the sensing unit 48a, in particular at least via the output unit 52a of the electronic device 14a, the external device 54a and/or the further external device 56a. It is also conceivable that a user can be supported/advised in an ordering process in dependence on data sensed by means of the sensing unit 48a relating to the at least one insert-tool-specific characteristic, in particular in dependence on the at least one usage characteristic, in particular via the output unit 52a of the electronic device, the external derive 54a and/or the further external device 56a. It is also conceivable that a retailer location, a price of an insert tool 12a or the like can be output via the output unit 52a of the electronic device 14a, the external device 54a and/or the further external device 56a. It is conceivable for the electronic device 14a to comprise at least one work illumination unit (not represented in more detail), which is designed to illuminate at least one work area of the insert tool 12a. The work illumination unit is preferably arranged on the housing 26a. It is conceivable for the work illumination unit to be releasably attached to the housing 26a or to be fixedly connected to the housing 26a. The work illumination unit preferably comprises at least one LED, a laser or the like. It is conceivable for the work illumination unit to be at least partially constituted by the output unit 52a of the electronic device 14a.

Figure 3:
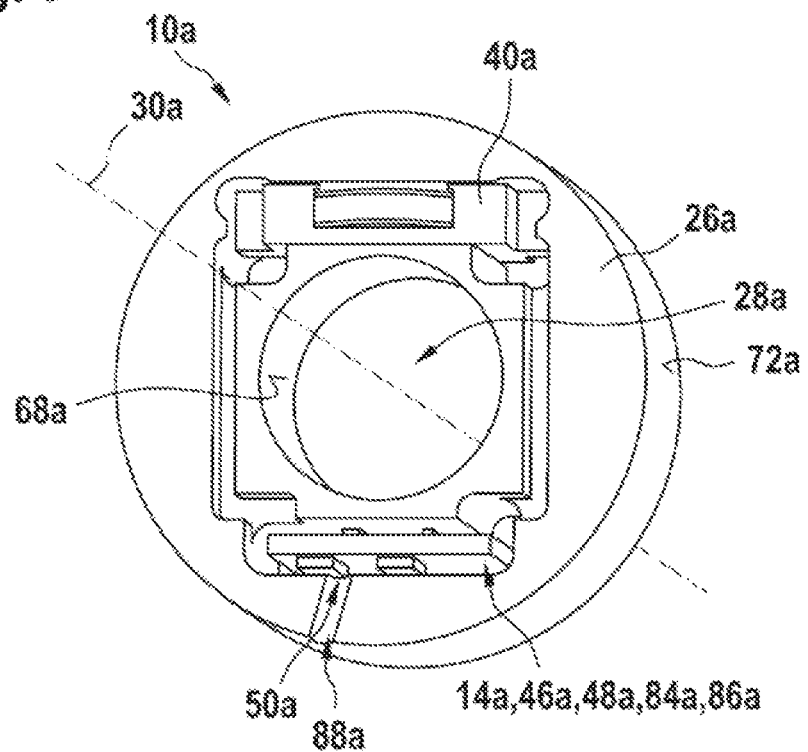

The electronic device 14a comprises at least one energy storage unit 40a (see FIG. 3). The energy storage unit 40a is designed to supply at least the sensing unit 48a with electrical energy. Electrical contacts between the sensing unit 48a and the energy storage unit 40a are at least partially soldered. Preferably, all electrical contacts between the energy storage unit 40a and the sensing unit 48a are soldered. Alternatively, it is also conceivable for at least the electrical contacts between the sensing unit 48a and the energy storage unit 40a not to have soldered joints. The energy storage unit 40a is realized, for example, as an accumulator, a battery or the like. The energy storage unit 40a is arranged in the housing 26a. The electronic device 14a, in particular the energy storage unit 40a, preferably comprises at least one charging terminal 50a by means of which the energy storage unit 40a can be charged. The energy storage unit 40a is arranged on a side of the housing 26a that is opposite a side on which at least the sensing unit 48a and/or the open-loop or closed-loop control unit 84a are/is arranged, at least as viewed from the central axis 30a of the receiving region 28a. Advantageously, particularly reliable sensing of the at least one insert-tool-specific characteristic can be ensured.

At least the sensing unit 48a is overmolded by the housing 26a of the holding device 16a. It is conceivable for the electronic device 14a to be at least substantially completely overmolded. Alternatively, it is also conceivable for at least the energy storage unit 40a to be interchangeably arranged on the housing 26a. The electronic device 14a, in particular at least the sensing unit 48a and/or the energy storage unit 40a, are/is overmolded by the housing 26a by a multi-component injection molding process or a coextrusion process, particularly preferably completely. The housing 26a has at least one recess 88a so that at least one charging cable can be connected to the charging terminal 50a for the purpose of charging the energy storage unit 40a.

It is conceivable for at least one operating parameter of the hand-held power tool 58a to be automatically settable in dependence on the at least one insert-tool-specific characteristic, in particular an ascertained wear condition and/or a fall event of the insert tool 12a. Additionally or alternatively, it is also conceivable for at least one operating parameter of the hand-held power tool 58a to be automatically settable in dependence on an ascertained identification of the insert tool 12a, preferably on the basis of sensed data relating to the at least one insert-tool-specific characteristic. For example, it is conceivable that in dependence on an evaluation of data of the at least one insert-tool-specific characteristic, in particular in dependence on an ascertained identification, an ascertained wear condition and/or an ascertained fall event, the hand-held power tool 58a can be switched off automatically, at least a maximum torque and/or a maximum operating power of the hand-held power tool 58a can be limited, or another adaptation of operating parameters of the hand-held power tool 58a, considered appropriate by persons skilled in the art, can be performed automatically.

Figure 4:
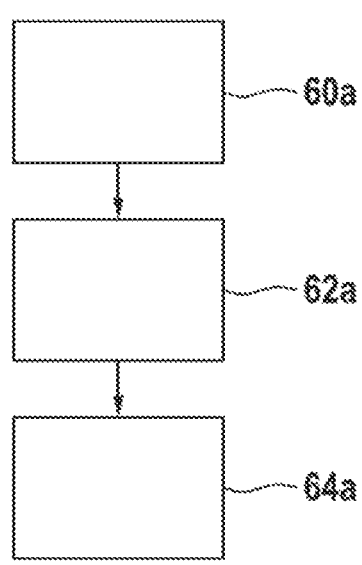

Represented in FIG. 4 is a schematic sequence of a method for operating the electronic module 10a. In at least one method step 60, at least one insert-tool-specific characteristic is sensed by means of the sensing unit 48a, in particular at least when the electronic device 14a has been arranged at the insert tool 12a. It is conceivable for a multiplicity of different insert-tool-specific characteristics to be sensed in the method step 60a by means of the sensing unit 48a. It is conceivable for data sensed by means of the sensing unit 48a relating to the at least one insert-tool-specific characteristic, or relating to the multiplicity of insert-tool-specific characteristics, to be stored on the memory unit in the method step 60. It is also conceivable for the data sensed by means of the sensing unit 48a relating to the at least one insert-tool-specific characteristic, or relating to the multiplicity of insert-tool-specific characteristics, to be filtered before being stored on the memory unit. Alternatively, it is also conceivable for the data sensed by means of the sensing unit 48a relating to the at least one insert-tool-specific characteristic, or relating to the multiplicity of insert-tool-specific characteristics, to be filtered and/or stored on the external device 54a, or on the further external device 56a, respectively following transmission to the external device 54a and/or to the further external device 56a. In at least one further method step 62a, data sensed by means of the sensing unit 48a relating to the at least one insert-tool-specific characteristic, or relating to the multiplicity of insert-tool-specific characteristics, are processed and/or evaluated, preferably by means of the open-loop or closed-loop control unit 84a of the electronic device 14a. Preferably, in the further method step 62a, in dependence on the data sensed by means of the sensing unit 48a relating to the at least one insert-tool-specific characteristic, or relating to the multiplicity of insert-tool-specific characteristics, at least one wear condition of the insert tool 12a and/or a fall event of the insert tool 12a is ascertained and/or the insert tool 12a is identified. In at least one additional method step 64a, in particular data sensed by means of the sensing unit 48a relating to the at least one insert-tool-specific characteristic, or relating to the multiplicity of insert-tool-specific characteristics, are transmitted to the external device 54a and/or to the further external device 56a. It is additionally or alternatively conceivable for items of information relating an ascertained wear condition, a fall event of the insert tool 12a and/or to an identification of the insert tool 12a to be transmitted to the external device 54a and/or to the further external device 56a in the additional method step 64a. It is also conceivable for items of information concerning the sensed data relating the at least one insert-tool-specific characteristic, or relating the multiplicity of insert-tool-specific characteristics, and/or concerning evaluations of the data, in particular relating to an ascertained wear condition, an ascertained fall event and/or on an identification of the insert tool 12a to be output in the additional method step 64, in particular by means of the output unit 52a of the external device 54a, of the further external device 56a and/or of the electronic device 14a. Also alternatively conceivable is another sequence of the method steps that is considered appropriate by persons skilled in the art. In particular, it is conceivable for the processing, in particular evaluation, of data sensed by means of the sensing unit 48a relating to the at least one insert-tool-specific characteristic, or relating to the multiplicity of insert-tool-specific characteristics, to be effected by means of the open-loop or closed-loop control unit 84a of the external device 54a and/or of the further external device 56a.

Further exemplary embodiments of the disclosure are shown in FIGS. 5 to 8. The descriptions and the drawing that follow are limited substantially to the differences between the exemplary embodiments, and in principle reference may also be made to the drawings and/or the description of the other exemplary embodiments, in particular of FIGS. 1 to 4, in respect of components that have the same designation, in particular in respect of components denoted by the same references. To distinguish the exemplary embodiments, the letter a has been appended to the references of the exemplary embodiment in FIGS. 1 to 4. In the exemplary embodiments of FIGS. 4 to 8, the letter a has been replaced by the letters b to e.

Figure 5:
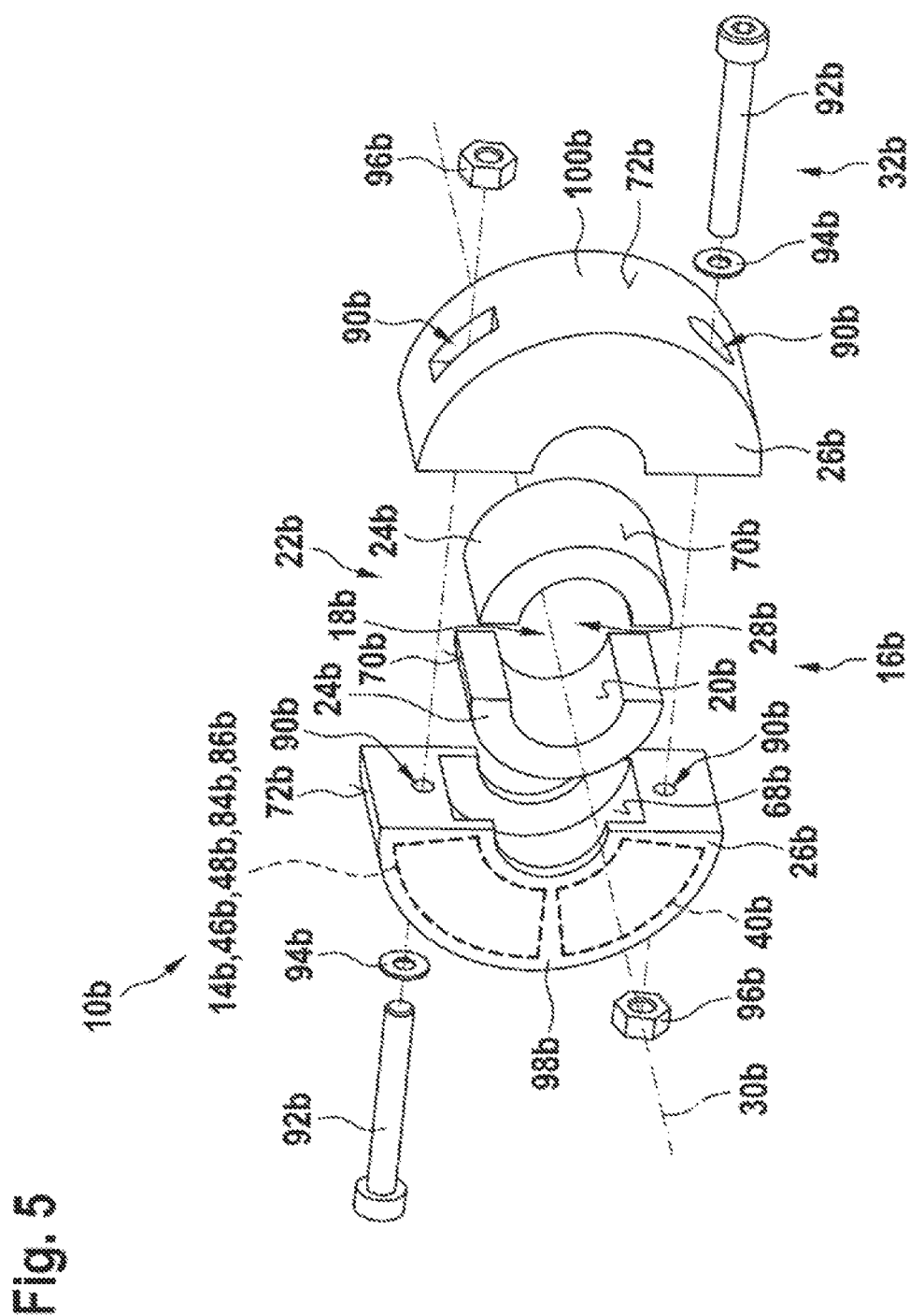

FIG. 5 shows an electronic module 10b for an insert tool. The insert tool is realized, for example, as a drill bit, chisel or the like. The electronic module 10b comprises at least one electronic device 14b for processing and/or sensing insert-tool-specific characteristics.

The electronic module 10b includes at least one holding device 16b for releasably holding the electronic device 14b on the insert tool. The holding device 16b comprises at least one insert-tool interface 18b. The insert-tool interface 18b comprises at least one contact surface 20b that, when the holding device 16b has been arranged on the insert tool, is in contact, in particular in direct contact, with the insert tool. The electronic module 10b comprises at least one damping unit 22b for damping vibrations acting on the electronic device 14b. The damping unit 22b at least partially constitutes the insert-tool interface 18b.

The damping unit 22b comprises two damping elements 24b realized in the manner of a circular ring segment, which in particular are made of an elastomer, in particular of rubber. Together, the two damping elements 24b have a cross-section corresponding to a whole circular ring, at least in an operating state. A housing 26b is realized in two parts. The holding device 16b comprises at least one holding unit 32b, which is realized as a screw connection. The housing 26b comprises a plurality of screw receivers 90b. The holding unit 32b comprises two screws 92b, two nuts 96b and two washers 94b. The screw receivers 90b are designed to receive the screws 92b at least for the purpose of attaching the holding device 16b to the insert tool 12b. The holding unit 32b is designed to screw together a first housing part 98b and a second housing part 100b of the housing 26b together, in particular for the purpose of attaching the housing 26b to the insert tool.

Figure 6:
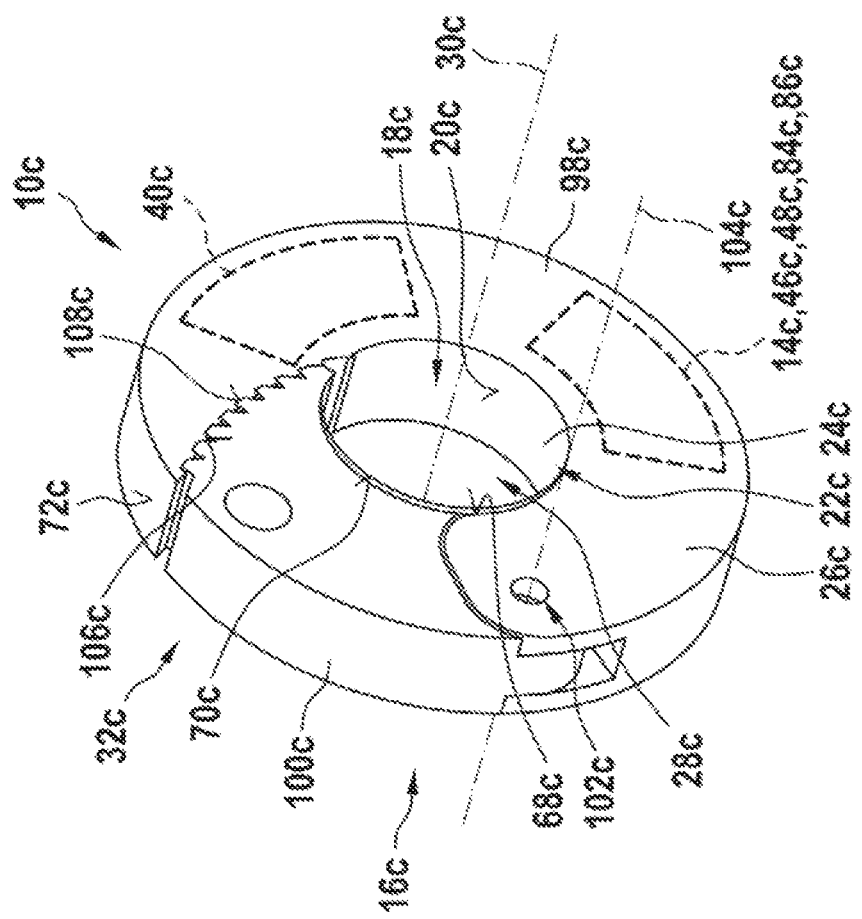

FIG. 6 shows an electronic module 10c for an insert tool. The insert tool is realized, for example, as a drill bit, chisel or the like. The electronic module 10c comprises at least one electronic device 14c for processing and/or sensing insert-tool-specific characteristics. The electronic module 10c comprises at least one holding device 16c for releasably holding the electronic device 14c on the insert tool. The holding device 16c comprises at least one insert-tool interface 18c. The insert-tool interface 18c comprises at least one contact surface 20c that, when the holding device 16c has been arranged on the insert tool, is in contact, in particular in direct contact, with the insert tool. The electronic module 10c comprises at least one damping unit 22c for damping vibrations acting on the electronic device 14c. The damping unit 22c at least partially constitutes the insert-tool interface 18c.

The damping unit 22c comprises a damping element 24c realized in the manner of a circular ring segment, which in particular is made of an elastomer, in particular of rubber. The damping element 24c has a cross-section corresponding to a circular ring segment, at least in one operating state. A housing 26c is realized in two parts. A first housing part 98c and a second housing part 100c of the housing 26c are mounted via a bearing element 102c so as to be rotatable relative to each other, in particular about a bearing axis 104c of the bearing element 102c. A central axis 30c of a receiving region 28c for the insert tool is at least substantially parallel to the bearing axis 104c. The holding device 16c comprises at least one holding unit 32c realized as a ratchet connection. One ratchet surface 106c of the holding unit 32c is realized on the first housing part 98c. A further ratchet surface 108c is realized on the second housing part 100c. As a result of the ratchet surface 106c acting in combination with the further ratchet surface 108c, the housing 26c can be attached to the insert tool.

Figure 7:
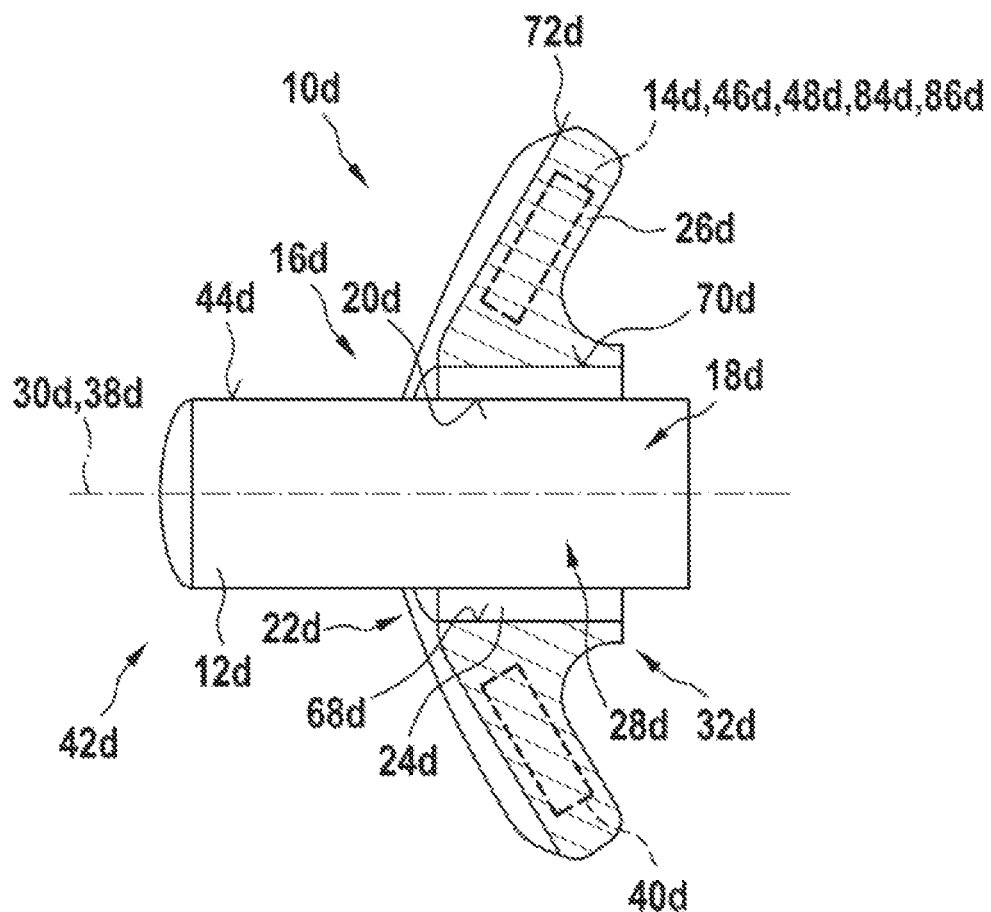

FIG. 7 shows an electronic module 10d for an insert tool 12d. The insert tool 12d is realized, for example, as a drill bit, chisel or the like. The electronic module 10d comprises at least one electronic device 14d for processing and/or sensing insert-tool-specific characteristics. The electronic module 10d comprises at least one holding device 16d for releasably holding the electronic device 14d on the insert tool 12d. The holding device 16d comprises at least one insert-tool interface 18d. The insert-tool interface 18d comprises at least one contact surface 20d that, when the holding device 16d has been arranged on the insert tool 12d, is in contact, in particular in direct contact, with the insert tool 12d. The electronic module 10d comprises at least one damping unit 22d for damping vibrations acting on the electronic device 14d. The damping unit 22d at least partially constitutes the insert-tool interface 18d.

The damping unit 22d comprises a damping element 24d realized in the manner of a circular ring segment, which in particular is made of an elastomer, in particular of rubber. The damping element 24d has a cross-section corresponding to a circular ring segment, at least in one operating state. A housing 26d is made of an elastic material. The holding device 16d has a holding unit 32d realized as a clamping cap. Preferably, the holding unit 32d is constituted by the housing 26d made of an elastic material. A holding force can be generated as a result of the housing 26d, made of an elastic material, stretching when the housing 26d is being arranged on the insert tool 12d.

FIG. 8 shows an electronic module 10e for an insert tool. The insert tool is realized, for example, as a drill bit, chisel or the like. The electronic module 10e comprises at least one electronic device 14e for processing and/or sensing insert-tool-specific characteristics. The electronic module 10e comprises at least one holding device 16e for releasably holding the electronic device 14e on the insert tool. The holding device 16e comprises at least one insert-tool interface 18e. The insert-tool interface 18e comprises at least one contact surface 20e that, when the holding device 16e has been arranged on the insert tool, is in contact, in particular in direct contact, with the insert tool. The electronic module 10d comprises at least one damping unit 22e for damping vibrations acting on the electronic device 14e. The damping unit 22e at least partially constitutes the insert-tool interface 18e.

The damping unit 22e comprises two damping elements 24e realized in the manner of a circular ring segment, which in particular are made of an elastomer, in particular of rubber. Together, the two damping elements 24e have a cross-section corresponding to a whole circular ring, at least in an operating state. A housing 26e is realized in two parts. A first housing part 98e and a second housing part 100e of the housing 26e are mounted via a bearing element 102e so as to be rotatable relative to each other, in particular about a bearing axis 104e of the bearing element 102e. A central axis 30e of a receiving region 28e for the insert tool is at least substantially parallel to the bearing axis 104e. The holding device 16e comprises at least one holding unit 32e realized as a clip lock. The holding unit 32e comprises at least one locking clip 110e arranged on the first housing part 98e. The holding unit 32 comprises at least one locking clip receiver 112e realized on the second housing part 100e. The locking clip 110e is designed to act in combination with the locking clip receiver 112e, in particular for the purpose of attaching the housing 26e to the insert tool.

What is claimed is:

1. An electronic module for an insert tool, comprising:
at least one electronic device configured to at least one of process and sense insert-tool-specific characteristics; and
at least one holding device configured to releasably hold the at least one electronic device on the insert tool, the at least one holding device including
at least one insert-tool interface including at least one contact surface that, when
the at least one holding device has been arranged on the insert tool, is in direct contact with the insert tool, and
at least one damping unit configured to damp vibrations acting on the at least one electronic device, wherein the at least one damping unit at least partially constitutes the at least one insert-tool interface.

2. The electronic module according to claim 1, wherein the at least one damping unit has at least one damping element, designed in the manner of a circular ring segment which constitutes the at least one contact surface of the at least one insert-tool interface.

3. The electronic module according to claim 1, wherein:
the at least one holding device comprises a housing in which the electronic device is arranged; and
the at least one damping element of the at least one damping unit constitutes the at least one contact surface of the insert-tool interface, and is arranged on a side of the housing that faces toward the insert tool when the at least one holding device is arranged on the insert tool.

4. The electronic module according claim 1, wherein:
the at least one damping unit at least partially surrounds a receiving region for the insert tool; and
the at least one holding device and the at least one damping unit, at least in an operating state, are configured to at least one of
have a common center of mass, and
have a central axis of the receiving region intersect a center of mass of the holding device and of the damping unit, at least as viewed in a plane perpendicular to the central axis.

5. The electronic module according to claim 1, wherein the at least one holding device comprises at least one holding unit which is designed for at least one of attaching and detaching the insert tool to/from the at least one insert-tool interface without use of tools, in a receiving region for the insert tool that is at least partially delimited by the at least one damping unit.

6. The electronic module according to claim 1, wherein the at least one holding device comprises at least one holding unit realized as a bayonet lock designed for releasably attaching the insert tool to the at least one insert-tool interface in a receiving region for the insert tool that is at least partially delimited by the at least one damping unit.

7. The electronic module according to claim 6, wherein the bayonet lock comprises at least one metallic locking ring.

8. The electronic module according to claim 1, wherein the at least one damping unit comprises at least one damping element realized as a shrink-on sleeve.

9. The electronic module according to claim 1, wherein the at least one damping unit comprises at least one damping element realized as an O-ring.

10. The electronic module according to claim 1, wherein the at least one damping unit at least partially constitutes the insert-tool interface in such a manner that the at least one damping unit, when the insert tool is arranged at the insert-tool interface, is designed at least to damp vibrations, acting on the electronic device, caused by impacts or shocks of the insert tool acting along an axis of rotation of the insert tool.

11. An insert tool system comprising:
at least one insert tool; and
at least the electronic module according to claim 1.

12. The insert tool system according to claim 11, wherein the at least one damping unit, when the electronic module is arranged on the insert tool, bears directly against an external surface of the insert tool.

13. The insert tool system according to claim 12, wherein the insert tool, at least when the electronic module is arranged on the insert tool, is at least substantially completely enclosed by the at least one damping unit and the holding device, at least as viewed along a circumferential direction of the insert tool.

* * * * *